(12) United States Patent
Sonetaka

(10) Patent No.: US 7,828,203 B2
(45) Date of Patent: Nov. 9, 2010

(54) DATA WRITING APPARATUS, METHOD, AND PROGRAM FOR PORTABLE TERMINAL MEMORY

(75) Inventor: Noriyoshi Sonetaka, Tokyo (JP)

(73) Assignee: NEC Corporation, Tokyo (JP)

( * ) Notice: Subject to any disclaimer, the term of this patent is extended or adjusted under 35 U.S.C. 154(b) by 866 days.

(21) Appl. No.: 10/587,577

(22) PCT Filed: Feb. 22, 2005

(86) PCT No.: PCT/JP2005/002795

§ 371 (c)(1),
(2), (4) Date: Jul. 31, 2006

(87) PCT Pub. No.: WO2005/081179

PCT Pub. Date: Sep. 1, 2005

(65) Prior Publication Data

US 2007/0158402 A1    Jul. 12, 2007

(30) Foreign Application Priority Data

Feb. 23, 2004   (JP)   ............... 2004-046335
Apr. 23, 2004   (JP)   ............... 2004-128086

(51) Int. Cl.
G06K 5/00 (2006.01)
G06K 7/00 (2006.01)
G06K 19/00 (2006.01)
G06F 3/00 (2006.01)
G06F 3/048 (2006.01)
H04M 3/42 (2006.01)
H04B 1/38 (2006.01)

(52) U.S. Cl. .............. 235/380; 235/487; 235/435; 235/382; 715/742; 715/744; 715/765; 455/414.1; 455/558

(58) Field of Classification Search ............... 235/380, 235/487, 435, 382; 705/26, 41; 455/414.1, 455/558; 715/742, 744, 765
See application file for complete search history.

(56) References Cited

U.S. PATENT DOCUMENTS 4,742,351 A    5/1988   Suzuki
(Continued)

FOREIGN PATENT DOCUMENTS

CN    A 1035960    9/2002
(Continued)

OTHER PUBLICATIONS

Taiwanese Office Action with English translations.
(Continued)

Primary Examiner—Daniel Walsh
(74) Attorney, Agent, or Firm—Whitham Curtis Christofferson & Cook, P.C.

(57) ABSTRACT

An object is to easily store a data required for actuating a portable terminal, which is used in association with an identification data of a user, while maintaining the security.

The present invention comprises a data reading/writing device having a function of reading out data stored in a memory medium of a portable terminal and a function of writing, to the memory medium, an applicable data which is required for the portable terminal; and a data collation device for collating an identification data which is peculiar to a user of the portable terminal, which is read out from the memory medium by the data reading/writing device, with a user registration data which is registered in advance, and for outputting a writing command to the data reading/writing device only when the data are consistent. The data reading/writing device writes the applicable data to the memory medium on condition that there is an input of the writing command.

12 Claims, 30 Drawing Sheets

U.S. PATENT DOCUMENTS

| | | | |
|---|---|---|---|
| 4,877,947 A * | 10/1989 | Mori | 235/380 |
| 5,286,954 A * | 2/1994 | Sato et al. | 235/379 |
| 6,742,038 B2 * | 5/2004 | Britt, Jr. | 709/228 |
| 6,776,339 B2 * | 8/2004 | Piikivi | 235/451 |
| 6,782,253 B1 * | 8/2004 | Shteyn et al. | 455/414.1 |
| 6,882,840 B2 * | 4/2005 | Fujiwara | 455/432.3 |
| 2001/0011249 A1 * | 8/2001 | Yanagihara et al. | 705/41 |
| 2002/0023158 A1 * | 2/2002 | Polizzi et al. | 709/227 |
| 2002/0026376 A1 * | 2/2002 | Shioda et al. | 705/26 |
| 2002/0032785 A1 * | 3/2002 | Britt, Jr. | 709/229 |
| 2002/0077085 A1 * | 6/2002 | Kalish et al. | 455/414 |
| 2002/0086704 A1 * | 7/2002 | Meindl et al. | 455/558 |
| 2002/0099658 A1 * | 7/2002 | Nielsen et al. | 705/43 |
| 2002/0125311 A1 * | 9/2002 | Ijichi et al. | 235/380 |
| 2002/0144007 A1 * | 10/2002 | Shteyn | 709/313 |
| 2002/0177407 A1 | 11/2002 | Mitsumoto | |
| 2003/0006280 A1 * | 1/2003 | Seita et al. | 235/380 |
| 2003/0032409 A1 * | 2/2003 | Hutcheson et al. | 455/414 |
| 2003/0085288 A1 * | 5/2003 | Luu | 235/492 |
| 2004/0054632 A1 * | 3/2004 | Remy | 705/64 |
| 2004/0065734 A1 * | 4/2004 | Piikivi | 235/451 |
| 2004/0083428 A1 * | 4/2004 | Slade | 715/513 |
| 2004/0098625 A1 * | 5/2004 | Lagadec et al. | 713/201 |
| 2005/0022013 A1 * | 1/2005 | Schwenk | 713/201 |
| 2005/0287987 A1 * | 12/2005 | Yamamoto | 455/410 |
| 2006/0049258 A1 * | 3/2006 | Piikivi | 235/451 |
| 2006/0063565 A1 * | 3/2006 | Ueno | 455/558 |
| 2007/0158402 A1 * | 7/2007 | Sonetaka | 235/375 |
| 2007/0162381 A1 * | 7/2007 | Petralia et al. | 705/38 |
| 2007/0162413 A1 * | 7/2007 | Sonetaka | 707/1 |
| 2007/0186107 A1 * | 8/2007 | Sonetaka | 713/170 |
| 2007/0191057 A1 * | 8/2007 | Kamada | 455/558 |
| 2007/0213096 A1 * | 9/2007 | Bella et al. | 455/558 |
| 2007/0224969 A1 * | 9/2007 | Rao | 455/411 |
| 2007/0293155 A1 * | 12/2007 | Liao et al. | 455/41.2 |
| 2008/0020755 A1 * | 1/2008 | Liu et al. | 455/432.1 |
| 2008/0076475 A1 * | 3/2008 | Kim | 455/558 |
| 2009/0029763 A1 * | 1/2009 | Schwartz | 463/25 |

FOREIGN PATENT DOCUMENTS

| | | |
|---|---|---|
| JP | 2000-030028 | 1/2000 |
| JP | 2000-059864 | 2/2000 |
| JP | 2000-115353 | 4/2000 |
| JP | 2001-357015 | 12/2001 |
| JP | 2001-357019 | 12/2001 |
| JP | 2002-055955 | 2/2002 |
| JP | 2002-145201 | 5/2002 |
| JP | 2002-203224 | 7/2002 |
| JP | 2002-236882 | 8/2002 |
| JP | 2002-251375 | 9/2002 |
| JP | 2002-259917 | 9/2002 |
| JP | 2002-279325 | 9/2002 |
| JP | 2002-351623 | 12/2002 |
| JP | 2003-020146 | 1/2003 |
| JP | 2003-141154 | 5/2003 |
| JP | 2003-162677 | 6/2003 |
| JP | 2003-345827 | 12/2003 |
| TW | 480449 | 3/2002 |

OTHER PUBLICATIONS

Office Action issued by the Taiwanese Patent Office on Jan. 14, 2008, with English language translation, pp. 1 to 7.
Japanese Office Action with English Translations.
Japanese Office Action with English Translation.

* cited by examiner

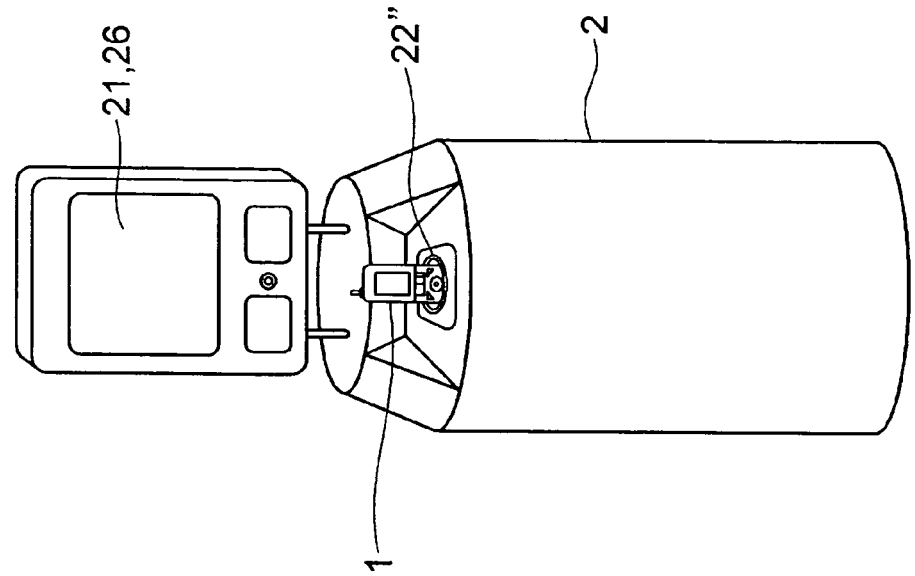
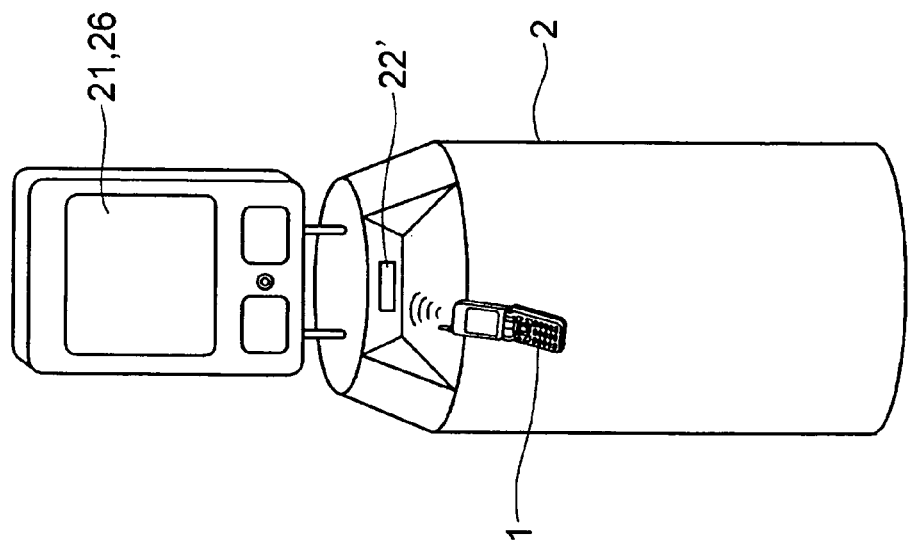

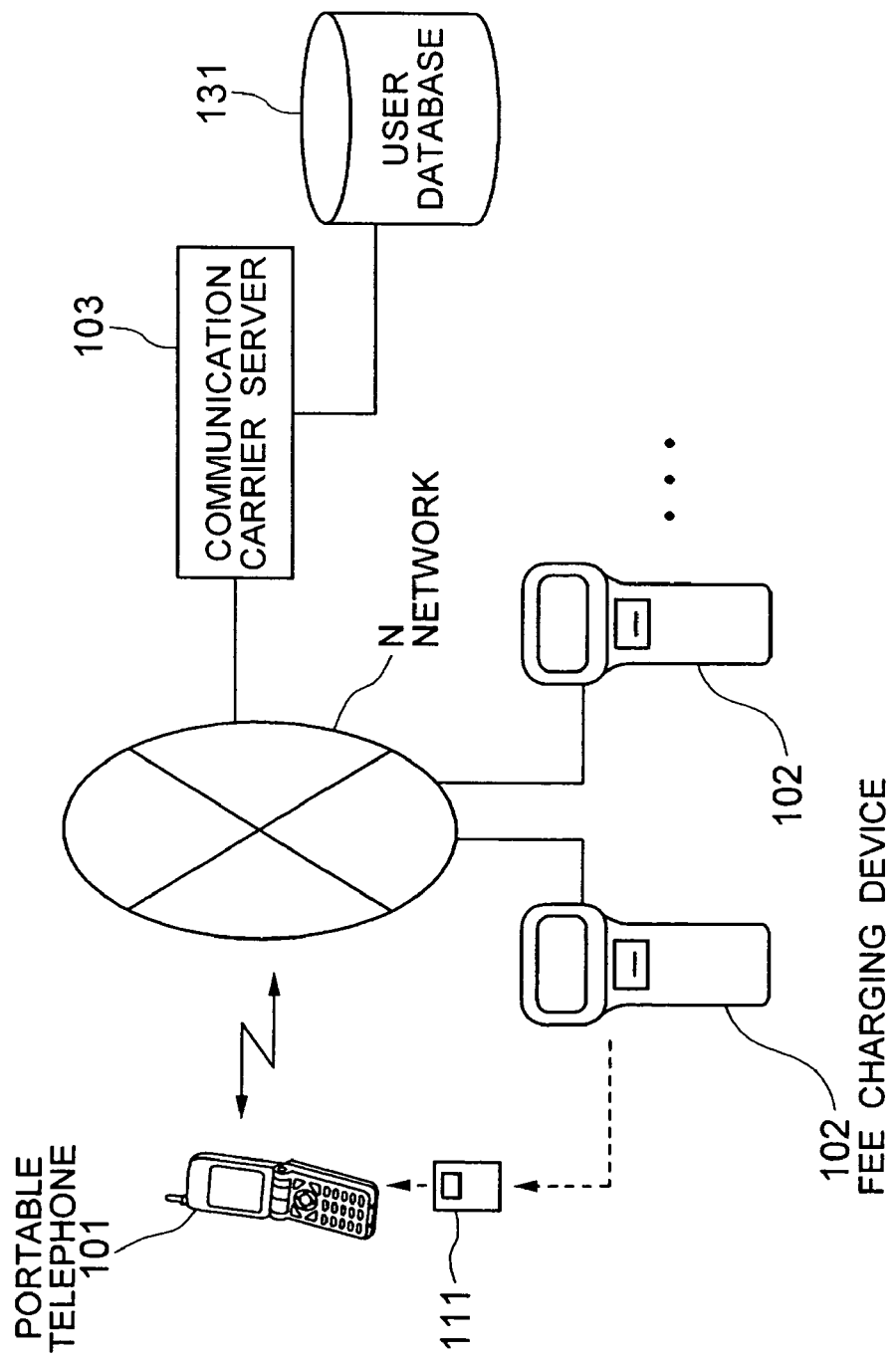

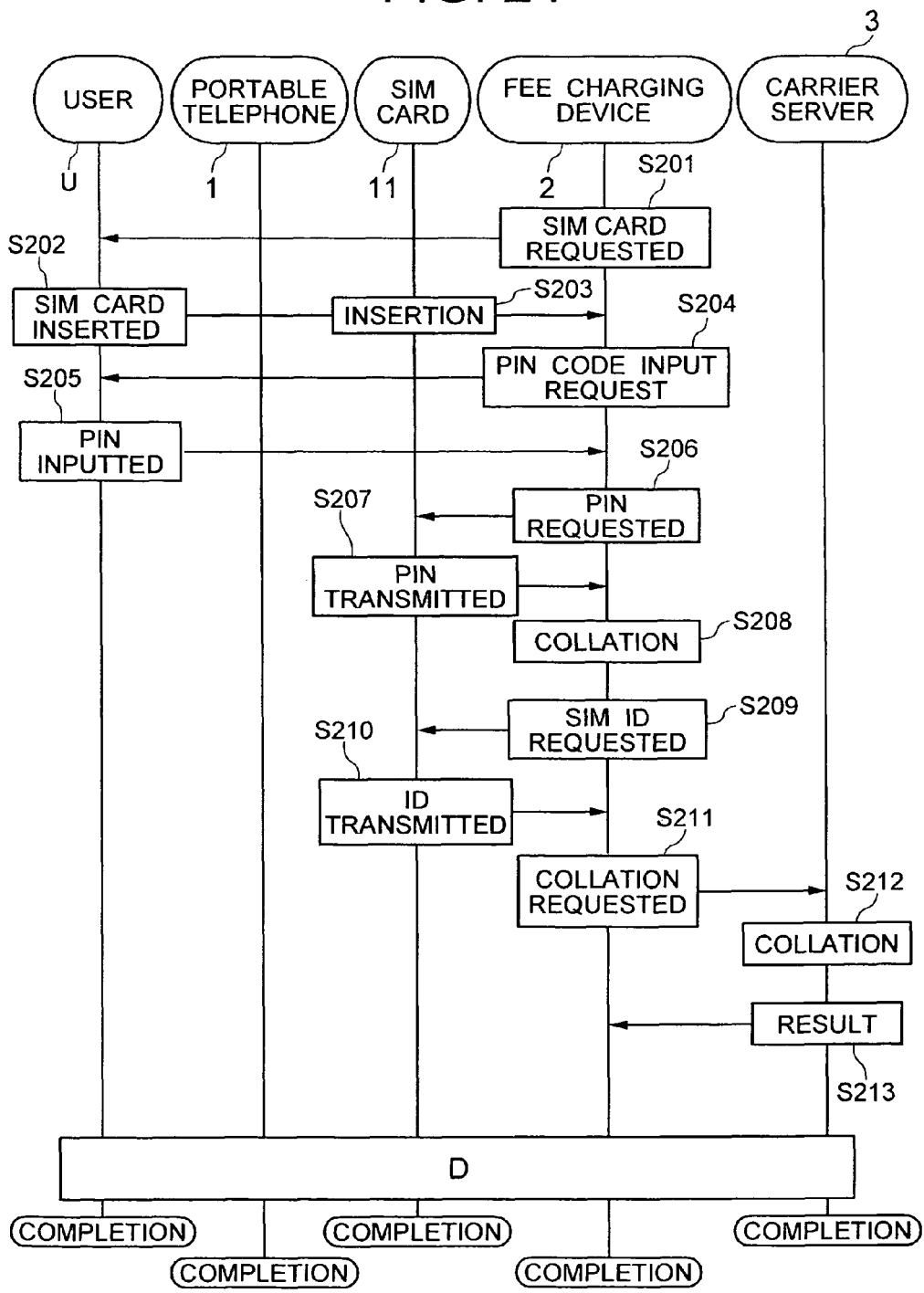

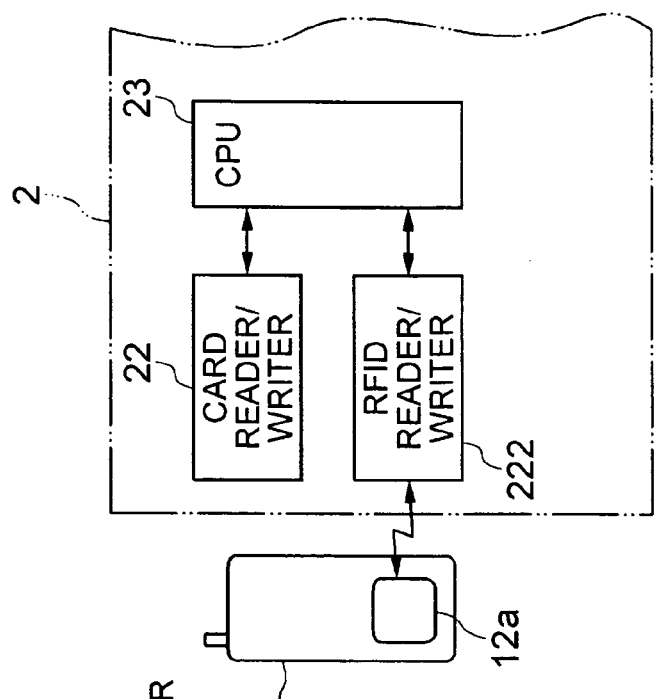
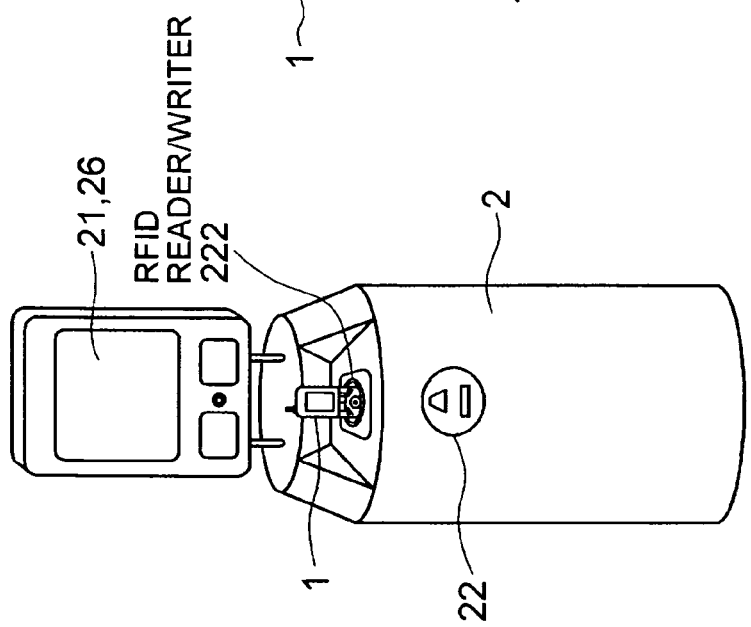
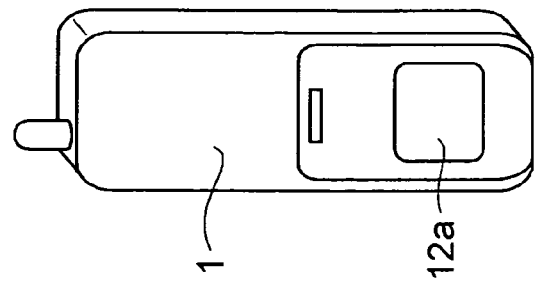

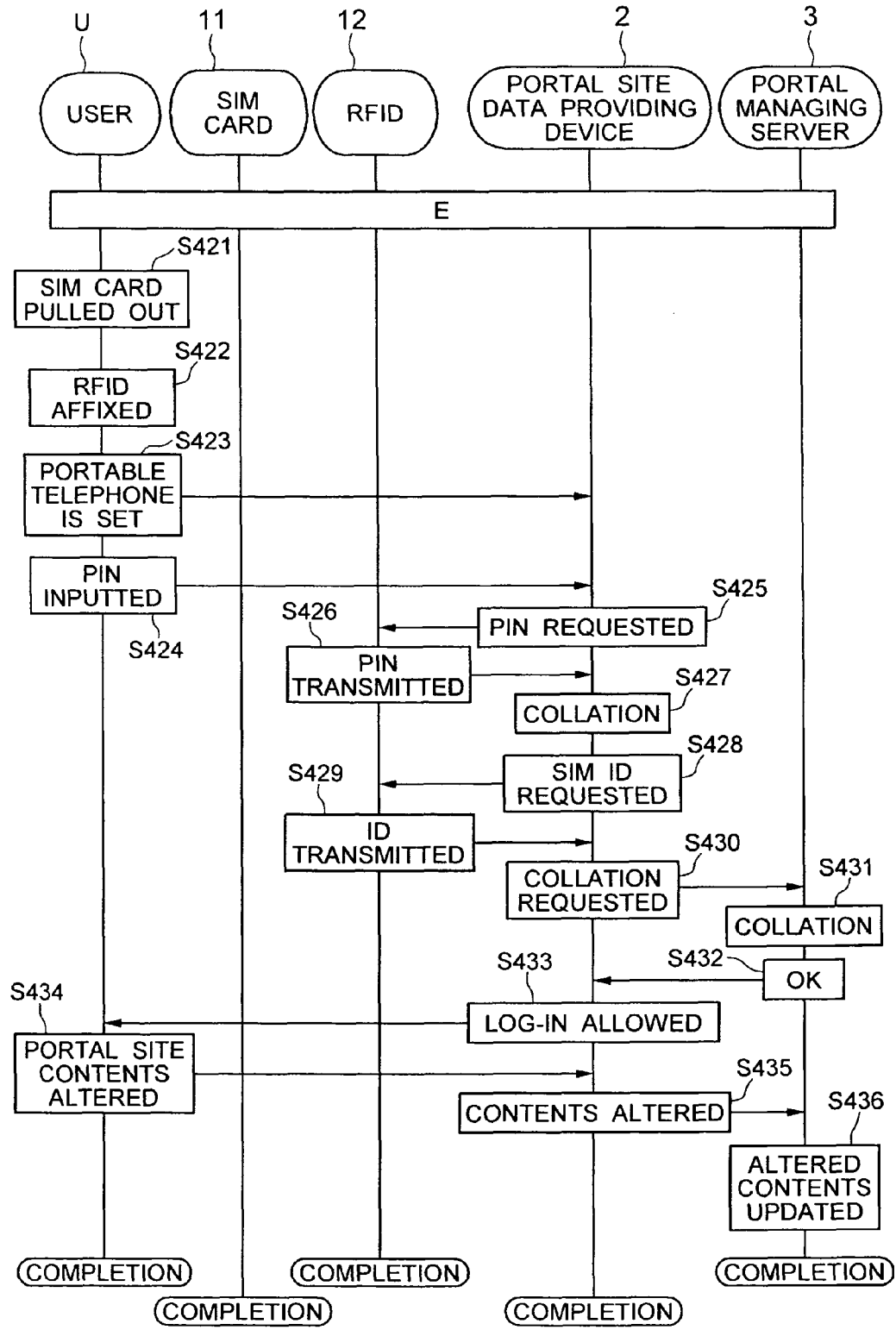

DATA WRITING APPARATUS, METHOD, AND PROGRAM FOR PORTABLE TERMINAL MEMORY

TECHNICAL FIELD

The present invention relates to a data writing apparatus for a portable terminal memory and, more specifically, to a data writing apparatus for a portable terminal memory, which enables to write an applicable data used at the time of actuating a portable telephone onto a memory medium without operating the portable terminal, and a method and a program used thereof.

BACKGROUND ART

In recent years, portable terminals have come to be used for variety of purposes. For example, there are various possible uses of a portable telephone, such as viewing websites through connecting to a network, cashing through the portable telephone, electronic ticketing, and the like. At this time, the provider of the service performs authentication of an identification data and the like stored in the portable terminal, which is peculiar to the user of the portable terminal, so that an illegal use by others can be suppressed.

Especially, an SIM card having the identification data peculiar to the user is mounted to a GSM-type portable telephone. Thus, by storing a data to be processed by specifying the user (data for a communication fee) in the card, the data is always stored along with the identification data. Therefore, the reading-out processing becomes easy and the security can be easily maintained as well.

Patent Literature 1: Japanese Patent Unexamined Publication No. 2003-141154

Patent Literature 2: Japanese Patent Unexamined Publication No. 2003-345827

DISCLOSURE OF THE INVENTION

Problems to be Solved by the Invention

In order to store the data used in association with the identification data into a memory medium of a portable telephone, such as an SIM card to which the identification data is stored, an operator may perform a recording work using a card writer or a user oneself may perform the work. Further, it is also considered to store the data obtained from another server on a network using a communication function of a portable terminal.

However, if an operator operates the storage region through a communication carrier of the portable telephone in spite that there is an important data stored in the SIM card and the like, there is a risk that the data within the card may be altered unnecessarily or may be duplicated, etc. Especially, in the SIM card, the subscription information of the user is stored. Thus, if it is duplicated, it enables others to use it and the communication fee and the like are charged only to the user whose data are copied, thereby causing a heavy loss.

In the meantime, the user oneself may write the data onto the SIM card with the user's own responsibility for storing various kinds of data. However, without the knowledge of data structure within the SIM card, an important data may be accidentally cancelled and altered. Further, in order for the user oneself to perform such rewriting, the operation is still difficult as in the case of operating the portable terminal.

Further, when storing the data obtained from another server on the network by using the communication function of the portable telephone, it has to be operated by a small operation unit with a limited number of keys in a small size through a display unit with a small screen. Thus, the operation is difficult to be performed.

Examples of the data necessary for actuating the portable telephone are communication fee data, the URL data of the portal site customized by the user, and the like. Specifically, in the former case using a prepaid type portable telephone, for example, a card of a proper amount for a certain communication fee is purchased and a code written to the card is inputted while the portable telephone is being connected to a prescribed dial number. Thereby, registration of the communication fee is completed. Then, the communication fee data is stored in the SIM card within the portable telephone, and it decreases every time the communication is performed.

Further, a method for building an own portal site of the user as in the latter case is disclosed in Patent Literature 1 and Patent Literature 2. Disclosed in both publications are devices which enable to customize the portal site for individual use. With the devices, by building the portal site displaying only the links for the sites which are often accessed by the user oneself and by making an access always to that site or by displaying such a site screen, it enables for the user to easily access to the target site.

However, in both cases of the communication fee and the URL as described above, it is still necessary to operate the portable telephone as a preparation. Thus, the above-described drawbacks still remain. Especially, it is difficult for a user who has just purchased a portable telephone to perform operation for customizing the portal site. Therefore, the user would access to the portal site of the communication carrier or the portal site of the terminal maker provided in advance, and the above-described drawbacks cannot be overcome.

An object of the present invention is to improve the inconveniences of the above-described conventional case and, especially, to provide a system which, while maintaining the security when performing reading/writing from/to the memory medium holding the identification data, enables to easily store the data required for actuating a portable telephone, which is used in association with an identification data of a user, in a memory medium holding the identification data.

Means for Solving the Problems

In order to achieve the foregoing object, the data writing apparatus for a portable terminal memory according to the present invention comprises: a data reading/writing device having a function of reading out data stored in a memory medium of a portable terminal and a function of writing, to the memory medium, an applicable data which is required for the portable terminal; and a data collation device for collating an identification data peculiar to a user of the portable terminal, which is read out from the memory medium by the data reading/writing device, with a user registration data which is registered in advance, and for outputting a writing command to the data reading/writing device only when the data are consistent, wherein the data reading/writing device writes the applicable data to the memory medium on condition that there is an input of the writing command.

By employing such configuration, the data required when the portable terminal performs a prescribed action is written only after performing authentication for checking whether or not the identification data peculiar to the user is stored in the memory medium of the portable terminal and is determined to be consistent. Thus, the data required to be used in association with the identification data can be surely stored in the memory medium so that the user can surely receive services peculiar to the user using the recorded data later on. Further, it is not necessary to have others operate the data within the memory medium to store it, or it enables to suppress the user oneself to operate the data within the memory medium unnecessarily. Therefore, while maintaining the security, the necessary data can be stored only in the own terminal and the convenience for the user can be improved. Moreover, by using such apparatus, it is possible to easily record the data without operating the hard-to-input operation unit which is mounted to the portable terminal.

Further, it may be in the configuration, comprising: an input device for inputting writing data specifying information for specifying contents of the applicable data; and a writing data specifying information receiving device for receiving the writing data specifying information requested by a user, which is inputted from the input device, wherein the data reading/writing device writes the applicable data which corresponds to the writing data specifying information onto the memory medium according to the writing command.

Thereby, it is possible for the user to specify the own desired data through the input device provided to the data writing apparatus. Thus, it is not necessary to operate the hard-to-operate portable terminal in which the number of keys is limited and the operation unit and the display unit is small. Therefore, as described above, the necessary data can be easily stored to the portable terminal while surely maintaining the security.

Further, it is desirable that the writing data specifying information be a communication fee data charged for connecting a portable terminal to a network. Also, it is desirable that the writing data specifying information be portal specifying information for specifying contents of a portal site which is displayed when connecting to a network through a portable terminal.

If the applicable data necessary for the portable terminal are, for example, the communication fee data of the prepaid portable telephone and the URL of the portal site desired by each user, it is possible to further improve the security by storing the applicable data for using them in cooperation with the identification data after collation of the identification data, since the applicable data are different for each user.

Further, it may be in the configuration in which the portable terminal is a portable telephone; the identification data peculiar to the user is an identification data which is allotted to a user-registered portable telephone by each user; and the data collation device collates the identification data read out from the memory medium with a user registration data held by a communication carrier of the portable telephone. Further, the portable terminal may be a GSM-type portable telephone and the memory medium is an SIM card.

Furthermore, it may be in the configuration in which the memory medium is a contact medium, which is removably mounted to the portable terminal and is removed from the portable terminal to be inserted to the data reading/writing device; and the data reading/writing device performs data reading/writing processing to the memory medium by being in contact with the memory medium. Moreover, it may be in the configuration in which the memory medium is a noncontact medium to be mounted to the portable terminal and reading/writing of data is performed without a contact; and the data reading/writing device performs data reading/writing processing to the memory medium in a noncontact state. In this case, an RFID tag may be used as the noncontact memory medium.

Further, it may be in the configuration in which the memory medium uses both a contact medium which is removed from the portable terminal to be inserted to the data reading/writing device and a noncontact memory medium which is mounted to the portable terminal for performing reading/writing of data without a contact; and the data reading/writing device has a function of performing reading/writing of a data to the memory medium by being in contact with the contact memory medium and a function of copying the data which is to be read/written from/to the noncontact memory medium.

In such configuration, first, for performing the collation processing by taking out the memory medium such as the SIM card which holds the identification data from the portable terminal, the identification data and the like stored in the memory medium to be collated are stored once in the noncontact memory medium such as the RFID tag which enables noncontact reading. By mounting the noncontact memory medium in such a manner that it can be read out from outside by affixing it to the outer face of the portable terminal, for example, it is possible to read out the identification data and the like from the noncontact memory medium at the time of making an access later on. Thus, it enables to suppress an inconvenience, for example, removing the medium such as the SIM card from the portable terminal every time when collating the user. Therefore, the convenience for the user can be improved.

Further, it may be in the configuration in which a contact memory medium is used as a medium for storing a data required for a portable terminal, wherein the contact memory medium is removed from a portable terminal to be inserted into a data reading/writing device having a function of reading out a data and a function of writing data, and data read and written in a state while being inserted. Further, it may be in the configuration a noncontact memory medium is used as a medium for storing a data required for a portable terminal, wherein reading/writing of data is performed in a state where the noncontact memory medium is noncontact with a data writing/reading device having a function of reading out a data and a function of writing a data.

For writing the data using the data writing apparatus for a portable terminal memory according to the present invention: a data stored in a memory medium of a portable terminal is read out; an identification data peculiar to a user of the portable terminal being read out from the memory medium is collated with a user registration data registered in advance; a writing command is outputted to the data reading/writing device only when the data are consistent; and the applicable data is written to the memory medium on condition that there is an input of the writing command.

A data writing program for actuating the data writing apparatus for a portable terminal memory according to the present invention comprises: a function of making a data reading/writing device execute reading-out processing of data stored in a memory medium of a portable terminal and writing processing of an applicable data necessary for the portable terminal onto the memory medium; a function of making a data collation device execute collation processing of an identification data peculiar to a user of the portable terminal, which is read out from the memory medium by the data reading/writing device, with a user registration data registered in advance, and execute output processing of a writing command to the data reading/writing device only when the data are consistent; and a function of making the data reading/writing device execute writing processing of the applicable data to the memory medium on condition that there is an input of the writing command.

Advantageous Effect of the Invention

The present invention is constituted and functions as described above so that it is possible to surely store the data required for actuating the portable terminal onto the memory medium, in association with the identification data. At this time, there is no chance for others to manipulate the data within the memory medium of a portable terminal in which the individual authentication information is stored. It is also possible to suppress the user to carelessly operate the identification data within the memory medium. Therefore, it is possible to surely store the necessary data in the own terminal while maintaining the security, and the convenience for the user can be improved.

BRIEF DESCRIPTION OF THE DRAWINGS

FIGS. 21A, B are schematic diagrams for showing the configuration of the portal site data providing device of the second embodiment;

FIG. 22 is a schematic diagram for showing the configuration of the present invention according to a fourth embodiment;

FIG. 24 is a sequence chart for showing the operation of the entire system according to the fourth embodiment;

FIGS. 27A-C are illustrations for describing applying examples of the fifth embodiment;

FIG. 30 is a sequence chart for showing the operation of the entire system according to the fifth embodiment continued from FIG. 29.

BEST MODE FOR CARRYING OUT THE INVENTION

The data writing apparatus for a portable terminal memory as the present invention is for writing the data required at the time of actuating the portable terminal onto the memory medium when the identification data stored in the memory medium of the portable terminal is user-registered. In the followings, a first embodiment will be described by referring to a case where the data to be written to the memory medium is the URL accessible to the portal site which can be customized for each user, and a second embodiment and a third embodiment will describe the modification examples of the configuration thereof. Further, a fourth embodiment will be described by referring to a case where the data to be written to the memory medium is the communication fee data of the prepaid system of the portable terminal. Furthermore, a fifth embodiment will illustrate another example of user authentication processing.

First Embodiment

Figure 1:
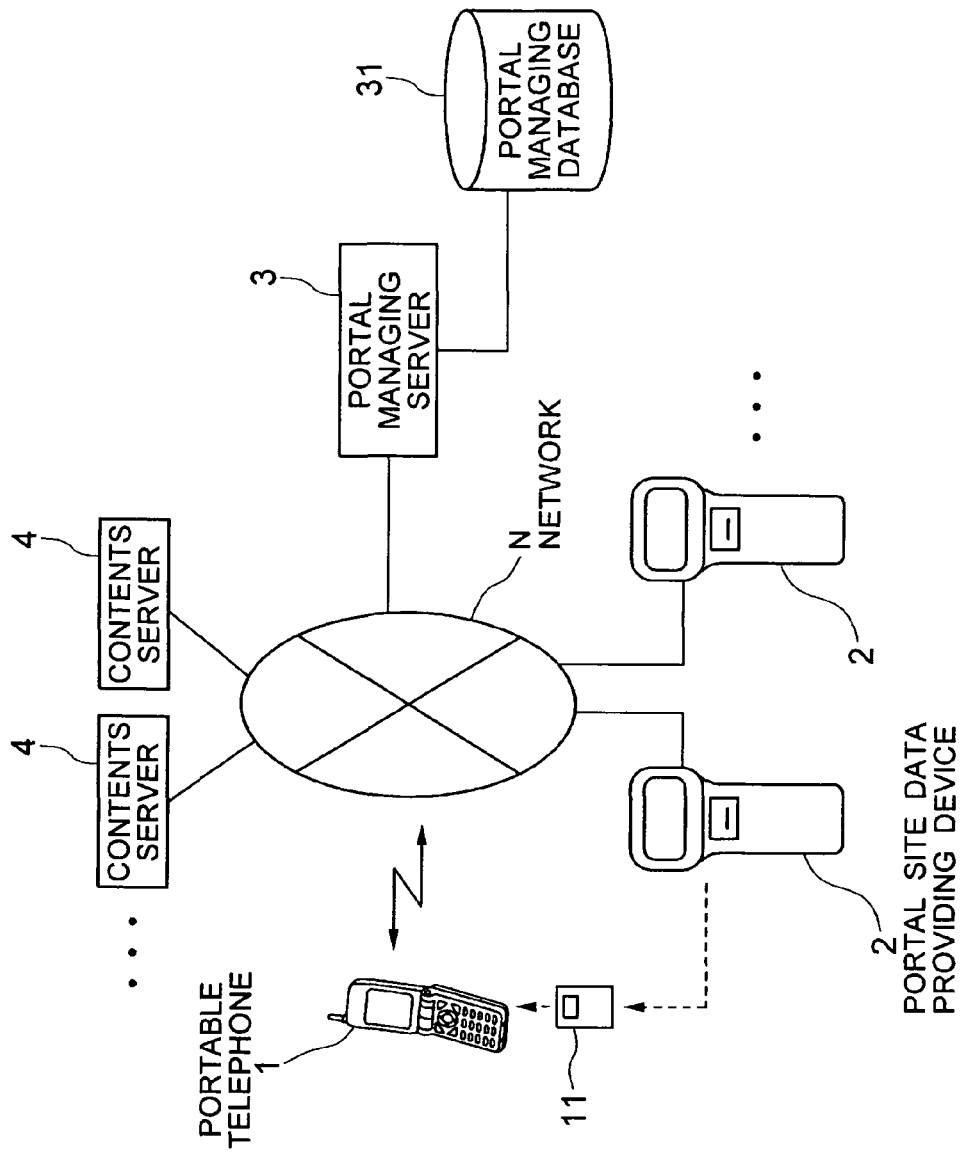
FIG. 1 is a schematic diagram for showing the configuration of the present invention.

The first embodiment of the present invention will be described by referring to FIG. 1-FIG. 20. FIG. 1-FIG. 3 are block diagrams for showing the configuration of the present invention. FIG. 4-FIG. 20 are illustrations such as flowcharts and the like for describing the operation of the present invention.

(Overall Configuration)

As shown in FIG. 1, the data writing system for a portable terminal memory as the present invention comprises: a portable telephone 1 which is a portable terminal owned by a user; a portal site data providing device 2 for directly providing the portal site data to a memory medium of the portable telephone 1; a portal managing server 3 being connected through a network N for managing the data, the user information and the like provided from the portal site data providing device 2; and a contents server 4 for distributing the contents by building a website. By associated operation of the portal site data providing device 2 and the portal managing server 3, as will be described later, it functions as the data writing apparatus for a portable terminal memory for storing the URL of the portal site to the memory medium, etc. when the identification data of the user stored in the memory medium of the portable telephone 1 is registered in the portal managing server 3 as a user registration data.

Now, the outline of the operation in the system will be described. First, the user of the portable telephone 1 inserts a memory medium such as an SIM card mounted to the portable telephone 1 into a card reader/writer of the portal site data providing device 2 at the time when the user subscribes for the portable telephone 1 for the first time to start using the service. Subsequently, when the identification data read out from the SIM card is user-registered in the portal managing database 31 of the portal managing server 3, the user selects the desired website on the display of the portal site data providing device 2 and stores the URL of the portal site in which the links to the site are displayed as a menu to the memory medium. Thus, by accessing to the URL along with the own identification data, the user can inform the user who is making an access to the URL as the connection target, so that the portal site peculiar to the individual can be displayed. Thereby, it enables to use the best suited portal site with the contents being set in advance. Therefore, the convenience at the time of connecting to the Internet can be more improved. In the followings, each constituent, that is, each computer will be described in detail.

(Portable Telephone)

The portable telephone 1 is a portable terminal owned by a prescribed user, which comprises a network connecting function. Therefore, it is accessible to various web servers so that it is possible to obtain various contents. In the portable terminal 1, a basic network connecting function is provided in advance, however, the kinds of portal sites it can make an access is unknown.

Further, the portable telephone 1, specifically, is a GSM-type telephone. The GSM-type is mainly used in Europe, which is a system using an SIM card for identifying a subscriber. The SIM card is an abbreviation of Subscriber Identify Module, which is issued when subscribing to the GSM service and can be used by being set in the GSM-type portable telephone. In the SIM card, stored are: an SIM_ID which is peculiar to each card; telephone number as the information of the subscriber; a PIN code as a personal identification number, and the like. It is in a system that the GSM-type telephone cannot be used until the SIM card is being set.

Further, the portable telephone 1 has a function of accessing to the URL by reading out an address data at the time of connecting to the Internet when the address data of the portal site is stored in advance. For example, the URL of the portal site is stored within the SIM card, and the portable telephone 1 has a function of accessing to the portal site by reading out the URL within a specific region of the SIM card. The URLs stored in the SIM card are stored by inserting the SIM card into the portal site data providing device in advance, as will be described later.

However, there are some portable telephone terminals which do not read out the URL stored in the SIM card. Thus, the terminal, depending on its type, may have a function of storing the URL distributed by short mail service (SMS) to a memory within the terminal and a function of accessing to the portal server by referring to the URL.

(Portal Site Data Providing Device)

Figure 2A:
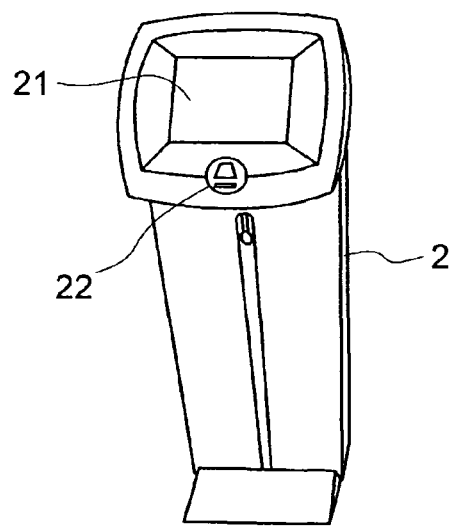
FIG. 2A is an illustration for showing the external appearance of a portal site data providing device and FIG. 2B is a functional block diagram for showing the configuration.
Figure 2B:
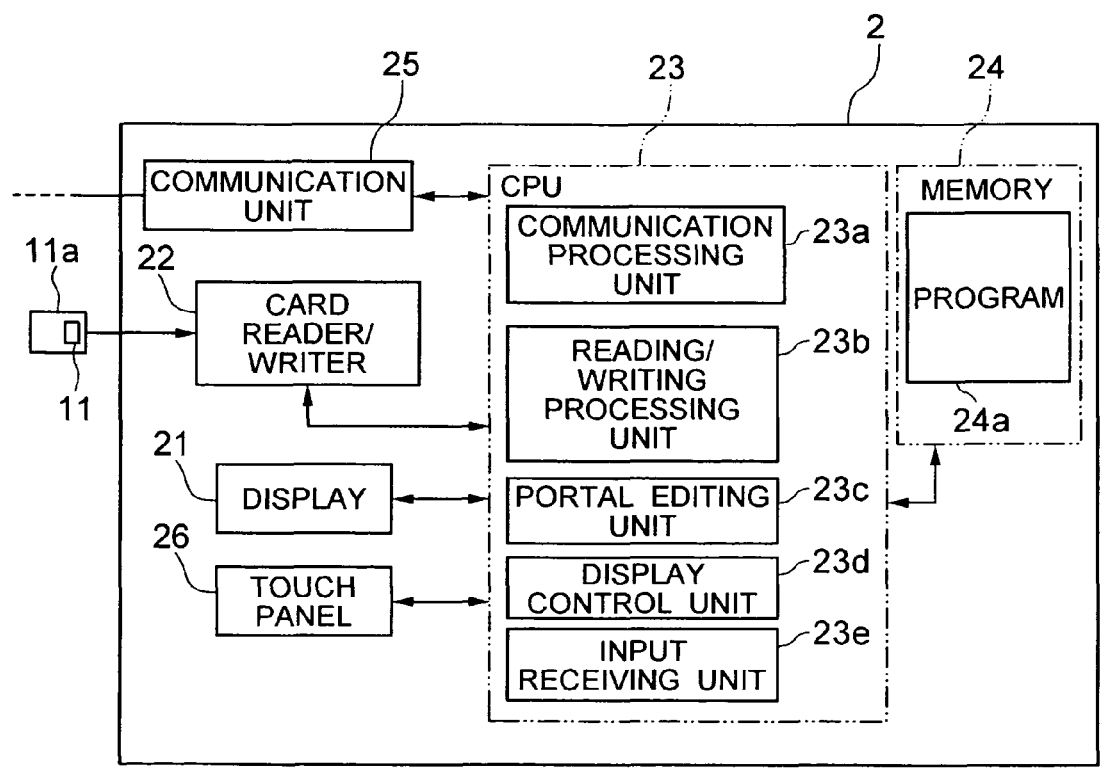
Figure 3:
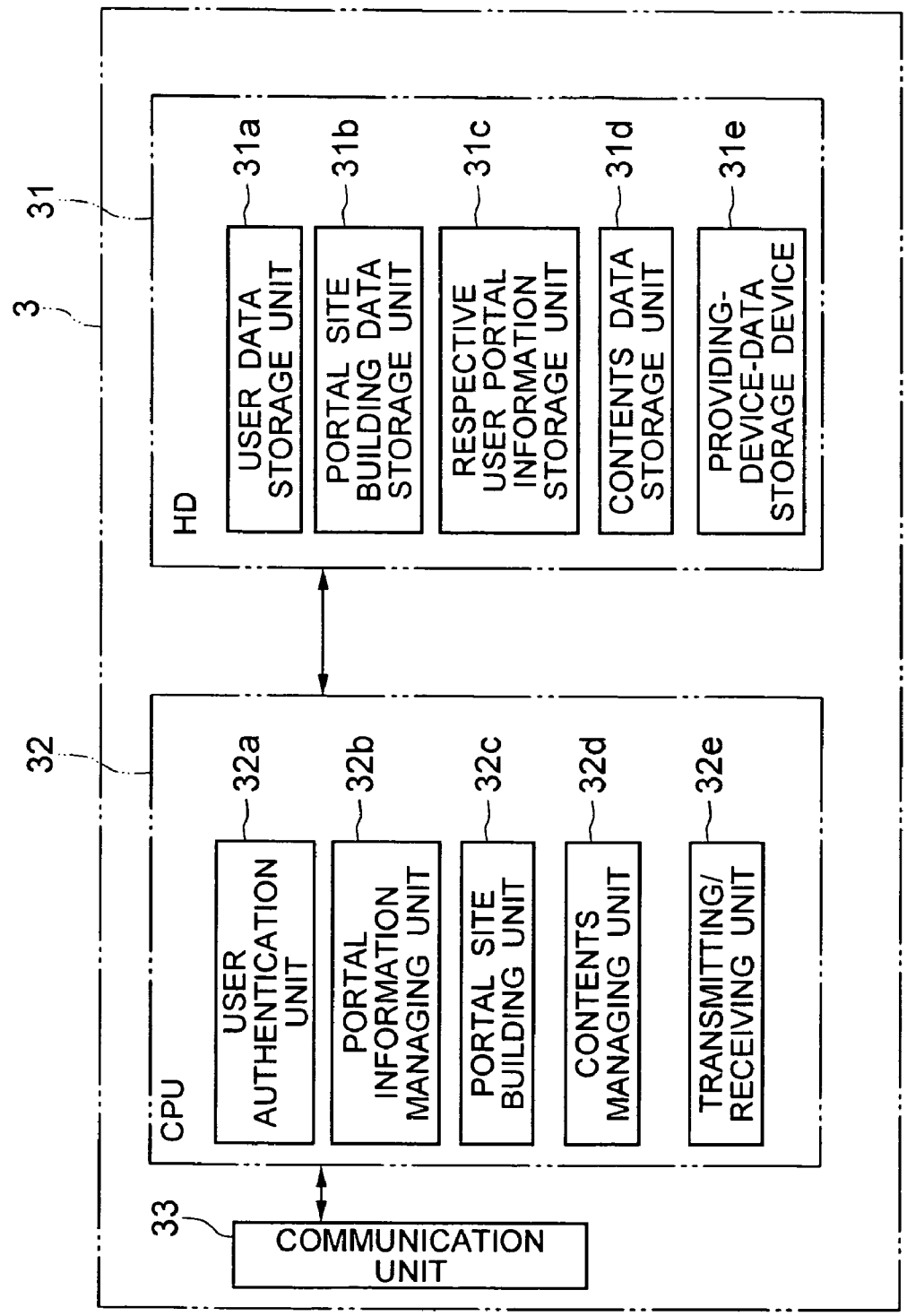
FIG. 3 is a functional block diagram for showing the configuration of a portal managing server.

FIG. 2 shows the portal site data providing device 2. FIG. 2A is an example of the external appearance and FIG. 2B is a functional block diagram of the configuration. The portal site data providing device 2, for example, is placed in portable telephone shops, convenience stores and the like.

The portal site data providing device 2 comprises: on its top face, a display 21 (displaying device) functioning as a touch panel 26 (input device); and a card reader/writer 22 (data reading/writing device) for reading/writing data from/to a storage region of an SIM card 11 of the portable telephone 1 when the SIM card 11 is inserted thereto by being mounted to a card holder 11a. The inside is constituted of computers, comprising a CPU 23 as an operation unit, a memory 24 or a hard disk as a storage unit. Further, the device can be connected to other computers through the network N and comprises a communication unit 25 as a communication device for achieving this.

In the CPU 23, each processing unit as shown below is built by reading out and mounting a program 24a which is stored in the memory 24 in advance, and the processing described below in the description of operation is achieved. That is, in the CPU 23, built are: a communication processing unit 23a for performing communication with other computers through the communication unit 25; a reading/writing processing unit 23b for performing reading/writing to/from the SIM card inserted to the card reader/writer 22; a portal editing unit 23c for setting the desired portal site according to the input from the user; a display control unit 23d for requesting a demand by displaying the configuration of the portal site and the like to the user; and an input receiving unit 23e for receiving the input data from the input unit 26 formed by a touch panel.

Specifically, the display control unit 23d receives, in advance, the contents of the portal server, that is, the portal contents information containing the information on the various websites accessible through the portal sites from the portal managing server which will be described later and displays it on the display. Further, the above-described portal editing unit 23c receives the portal information containing the specific information of the website which constitutes the portal site selected by the user through the input receiving unit 23e from the display on the display control unit 23d (writing data specifying information receiving device). The portal information is the data for specifying the contents of the portal site, and the URL for making an access to the corresponding site is written to the SIM card as will be described later. Further, the portal editing unit 23c (portal information transmitting device) transmits the received portal information to the portal managing server, including the SIM_ID which is an identification data peculiar to the user read out from the SIM card 11 which is inserted to the card reader/writer 22 in the reading/writing processing unit 23b.

The reading/writing processing unit 23b (data reading/writing device) reads out the SIM_ID from the SIM card (identification data reading-out device) as described above and also checks whether or not the SIM_ID is pre-registered (data collation device). When the identification data is consistent with the registered data, the URL to be the address data for the portal site is written (address data storage device) to the SIM card 11 of the user whose portal information is determined. The address data is the URL data being set in advance and stored in the portal managing server 3. However, as will be described later, the identification data such as the SIM_ID is added to the URL when the URL is actually written to the SIM card. That is, when making an access to the URL later on, it is transmitted to the web server of the access target along with the SIM_ID as the identification data of the user.

The data collation processing performed by the above-described reading/writing processing unit 23b may be performed by a portal managing server 3 as will be described later. In such a case, the user registration data is stored in advance within the portal managing database 31 to be collated with the data. In the followings, the description of the operation is provided by referring to the case where collation is performed by the portal managing server 3.

The above-described portal information is referred to when building the portal site in the portal managing server 3. That is, the portal site is built based on the portal information. The portal site is built by corresponding to the user who is making an access and the portal site information is transmitted to the portable telephone 1. Each processing performed by the CPU will be described in detail at the time of describing the operation.

The portal site in the present invention is a site which is essentially displayed when connecting to the Internet using the portable terminal 1. In general, there are portal sites built by the communication carriers, sites provided by terminal makers, and further, portal sites having various types of search engines. However, in the present invention, the portal site is not necessarily limited to websites. It may be data displayed essentially in the screen at the time of connecting to the Internet connection, which is stored in the portable terminal.

(Portal Managing Server)

The portal managing server 3 is a server which, as described above, provides various data to the portal site data providing device 2 and manages the data regarding the portal site, which is customized by the user. In FIG. 1, a portal managing database 31 as the storage unit is separately illustrated from the portal managing server 3. However, it may be stored within the portal managing server as a server computer. The configuration of the portal managing server 3 (including the portal managing database) will be described by referring to the functional block diagram of FIG. 3.

In the CPU of the portal managing server 3, a specific program is installed. Thereby, it comprises a function of managing various data such as the data to be supplied to the portal site data providing device 2 to be displayed on the display 21 of the device 2, the portal information for specifying the portal site for each user, and the like. Specifically, built are: a transmitting/receiving unit 32*e* for performing transmission/reception of the data between with the portal site data providing device 2 and for performing distribution of the portal site which is built in response to the access from the portable telephone 1; a user authentication unit 32*a* for checking whether or not the PIN code read out from the SIM card and the SIM_ID as the identification data peculiar to the user are user-registered; a portal managing unit 32*b* for managing the portal information which is the constituent of the portal being set by each user; a portal site building unit 32*c* for building the portal site based on the portal information; and also a contents managing unit 32*d* for managing the contents (website) which can be contained in the portal site.

In accordance with this, built in the portal managing database 31 are: a user data storage unit 31*a* for storing the registration information of the registered user who has already used the system; a portal site building data storage unit 31*b* to which materials for building the portal site are stored; a respective user portal information storage unit 31*c* showing the configuration of the portal site for each user; a contents storage unit 31*d* to which the contents to be distributed to the portable terminal 1 of the user is stored; and also a providing-device-data storage unit 31*e* containing the screen information displayed by the portal site data providing device 2 and the control program. In the providing-device-data storage unit 31*e*, the URL of the site to be the address of the portal site built by the portal managing server 3 itself is stored. The URL is provided to the portal site data providing device 2 and written to the SIM card 11 of the portable telephone 1 by the device 2. The functions of each processing unit and the contents of the data will be described in detail at the time of describing the operation. The above-described user authentication unit 32*a* functions as the data collation device of the portal site data providing device 2 as described above and outputs the collation result.

(Operation)

Figure 4:
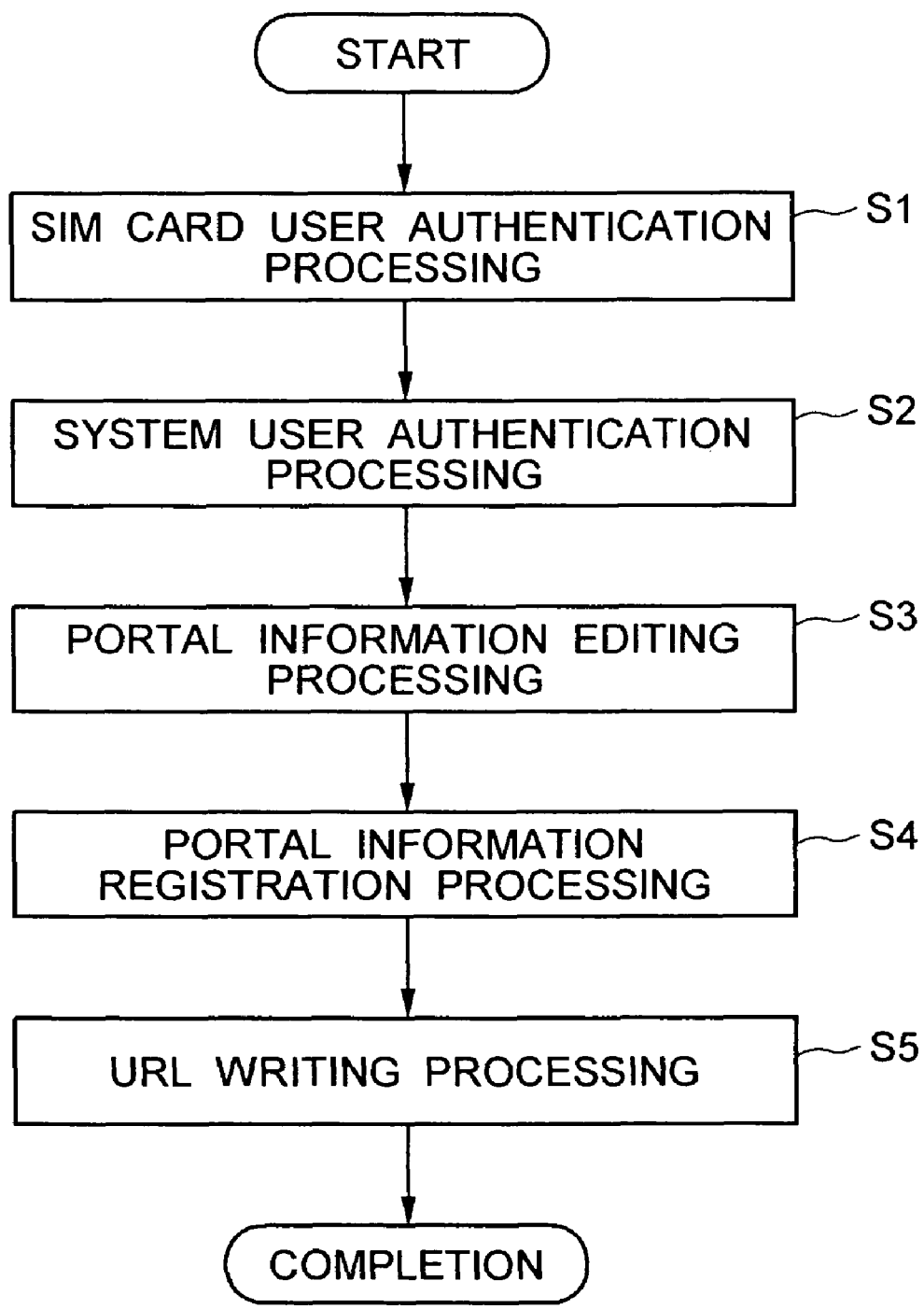
FIG. 4 is a flowchart for showing the operation of the portal site data providing device.
Figure 5:
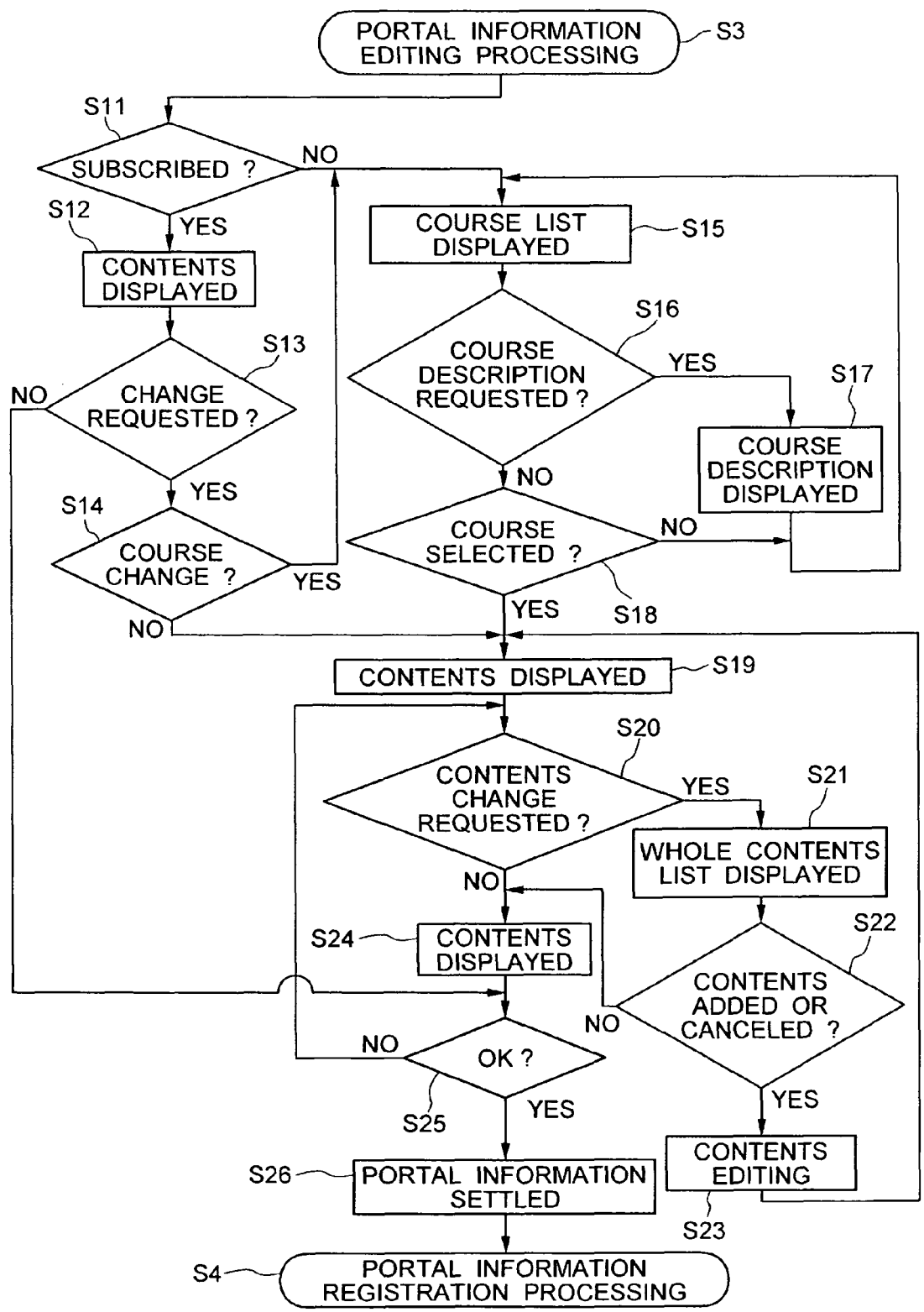
FIG. 5 is a flowchart for showing the operation of portal information editing processing as a part of the processing by the portal site data providing device.
Figure 6:
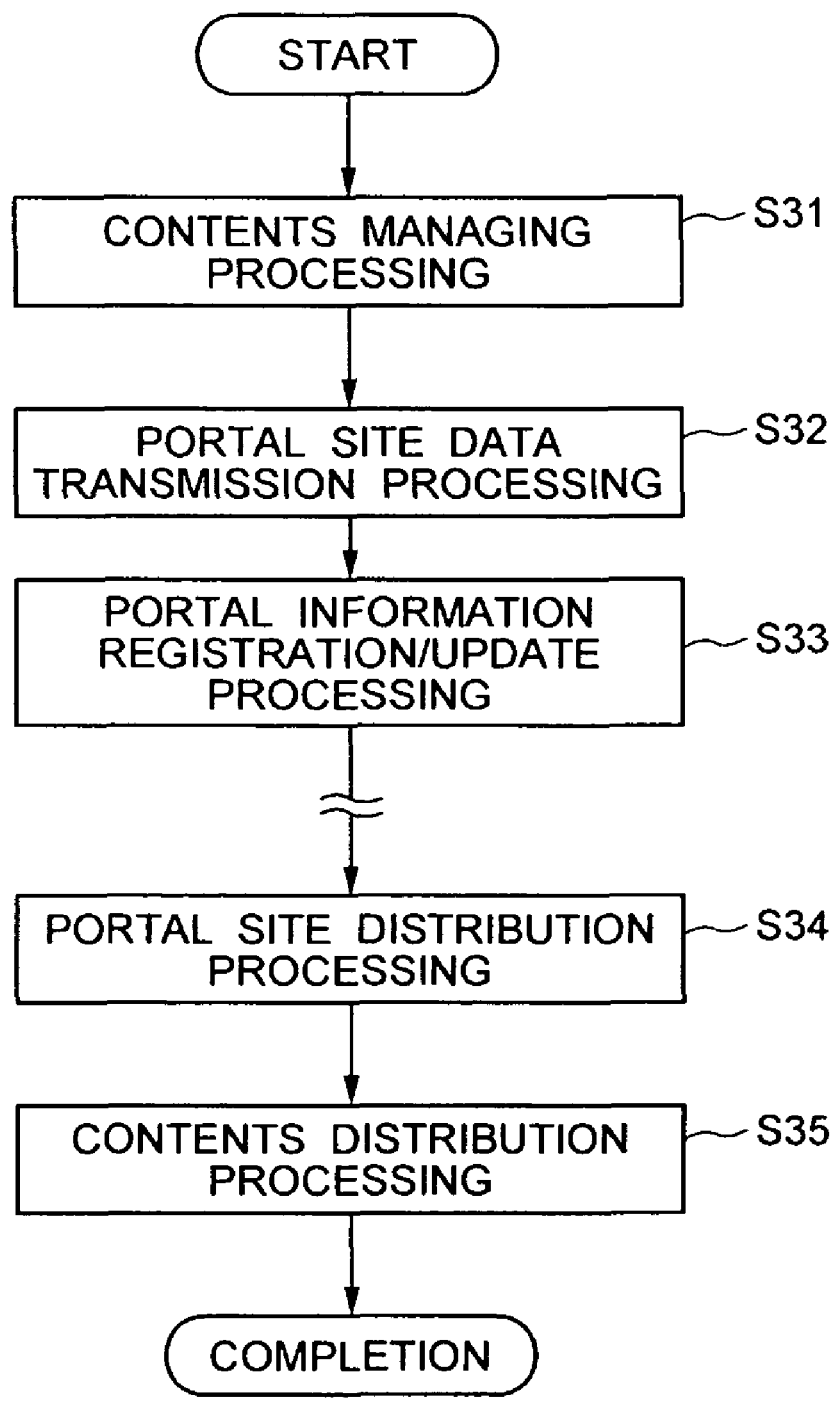
FIG. 6 is a flowchart for showing the operation of the portal managing server.
Figure 7:
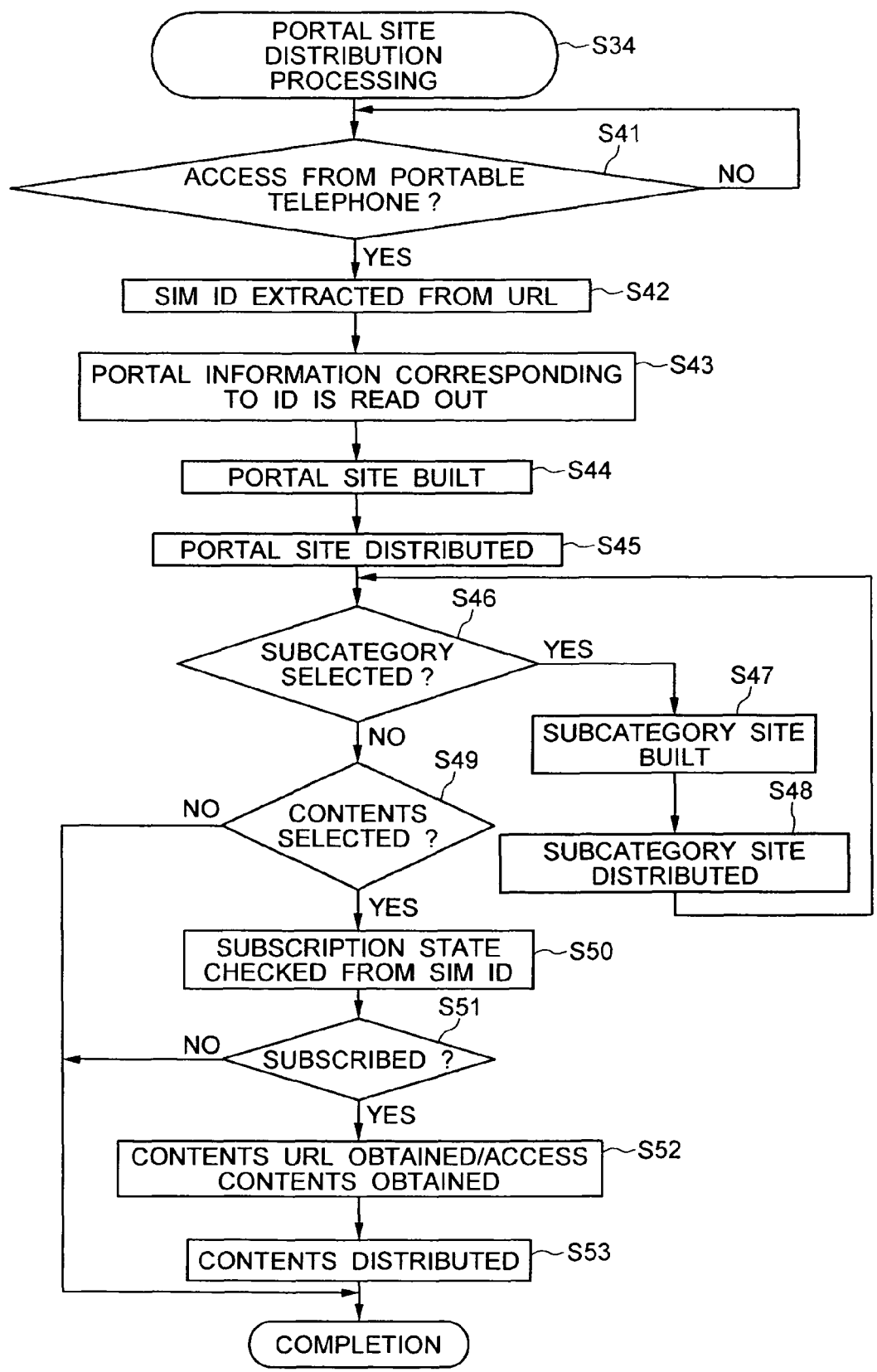
FIG. 7 is a flowchart for showing the operation of portal site distribution processing as a part of the processing performed by the portal managing server.

Next, the operation of the above-described system will be described by referring to FIG. 4-FIG. 20. FIG. 4 is a flowchart showing the operation of the portal site data providing device 2, and FIG. 5 is a flowchart showing the operation of the portal information editing processing as a part of the processing thereof. FIG. 6 is a flowchart showing the operation of the portal managing server 3, and FIG. 7 is a flowchart showing the operation of the portal site distribution processing as a part of the processing thereof. FIG. 8-FIG. 11 are sequence charts showing the operation of the entire system, and FIG. 12-FIG. 20 are illustrations for showing screens displayed on the display 21 of the portal site data providing device 2. The operation of the entire system will be described hereinafter by referring mainly to the sequence charts of FIG. 8-FIG. 11. At the same time, the detailed operation will be described by referring to other drawings.

(Operation of Portal Site Providing Device)

First, when subscribing for the portable telephone 1 for the first time, the user of the portable telephone 1 obtains the SIM card 11 to be used therewith. In the initial state, the SIM card 11 is mounted to the card holder 11*a*. Although the newly subscribed user will be mainly described in the followings, the case of a user who has already used the system will be described as well. In that case, the SIM card 11 needs to be mounted to the card holder 11*a* and inserted to the portal site data providing device 2.

The user uses the portal site data providing device 2 for storing the address data of the desired portal site of the user oneself to the SIM card 11. The operation of the portal site data providing device 2 can be achieved when the data stored in the providing-device-data storage unit 31*e* of the portal managing server 3 is supplied through the transmission/reception unit 32*e* (step S101 of FIG. 8) to be mounted to the CPU 23. For example, the screen data displayed on the display, the courses of the selectable portal sites, contents of each course, data regarding the websites which can be added to the portal site, and also the address data for accessing to the portal site are transmitted to the portal site data providing device 2 from the portal managing server 3.

Figure 12A:
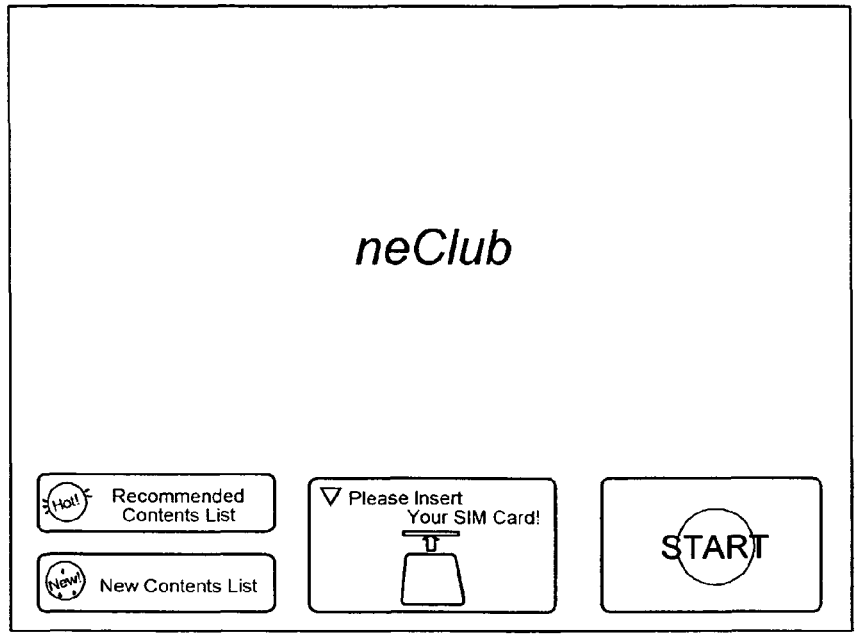
FIGS. 12A, B are illustrations for showing examples of screens displayed in the portal site data providing device.
Figure 12B:
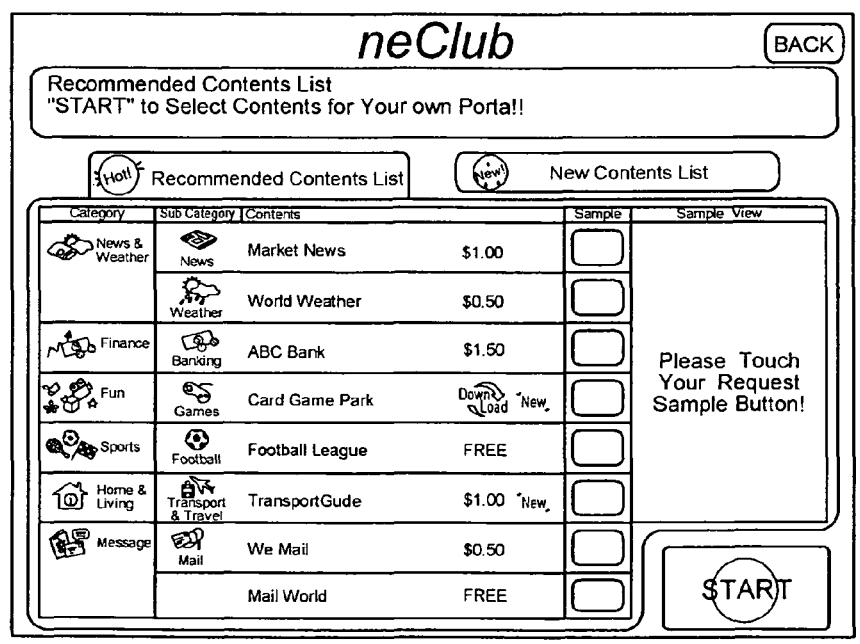

When the user touches the display 21 of the portal site data providing device 2, first, the screen as shown in FIG. 12A is displayed on the display 21 of the portal site data providing device 2 as an opening screen. Then, the user, according to a command for inserting the SIM card (step S102 of FIG. 8) as displayed in the center of the bottom of the screen, inserts the SIM card into the card reader/writer 22 (see FIG. 2A) (steps S103, S104 of FIG. 8). By selecting a button positioned in the bottom left of the opening screen, update information of the contents which can be mounted to the portal site is displayed as shown in FIG. 12B. The update information on these contents is also supplied from the portal managing server 3 (the contents data storage unit 31*d*).

Figure 13A:
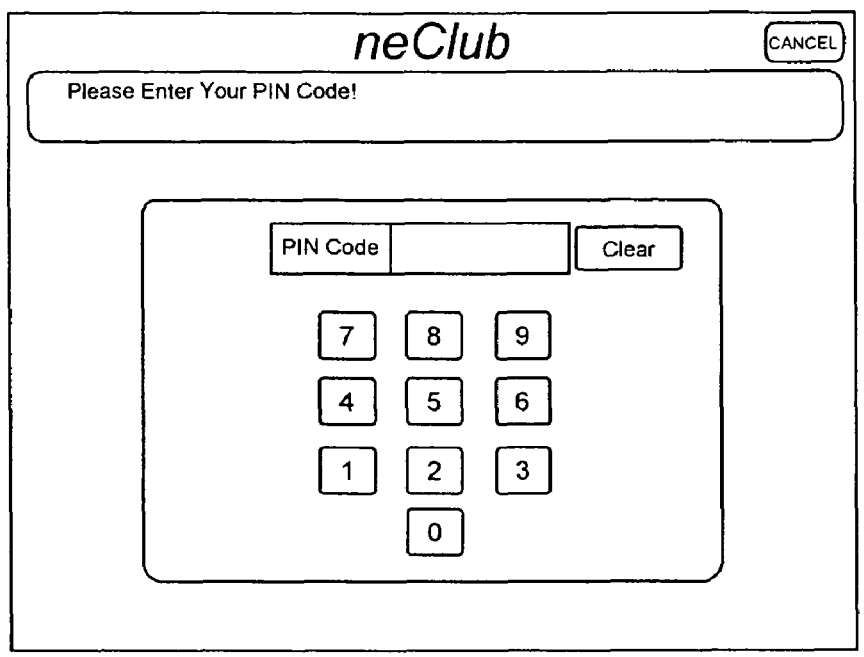
FIGS. 13A, B are illustrations for showing examples of screens displayed in the portal site data providing device.

Subsequently, the portal site data providing device 2 to which the SIM card is inserted, as shown in FIG. 13A, requests a user U to input the PIN code of the SIM card (step S105 of FIG. 8). In response, when the user inputs the PIN code (step S106 of FIG. 8), the portal site data providing device 2 stores it and also reads out the PIN code stored in the SIM card inserted to the card reader/writer 22 (steps S107, S108 of FIG. 8), and checks whether or not it is the same as the one inputted by the user (step S109 of FIG. 8). Thereby, the authentication processing of the SIM card user is performed (step S1 of FIG. 4). Thus, a proper use by the user having the SIM card is achieved and the security can be improved.

Figure 8:
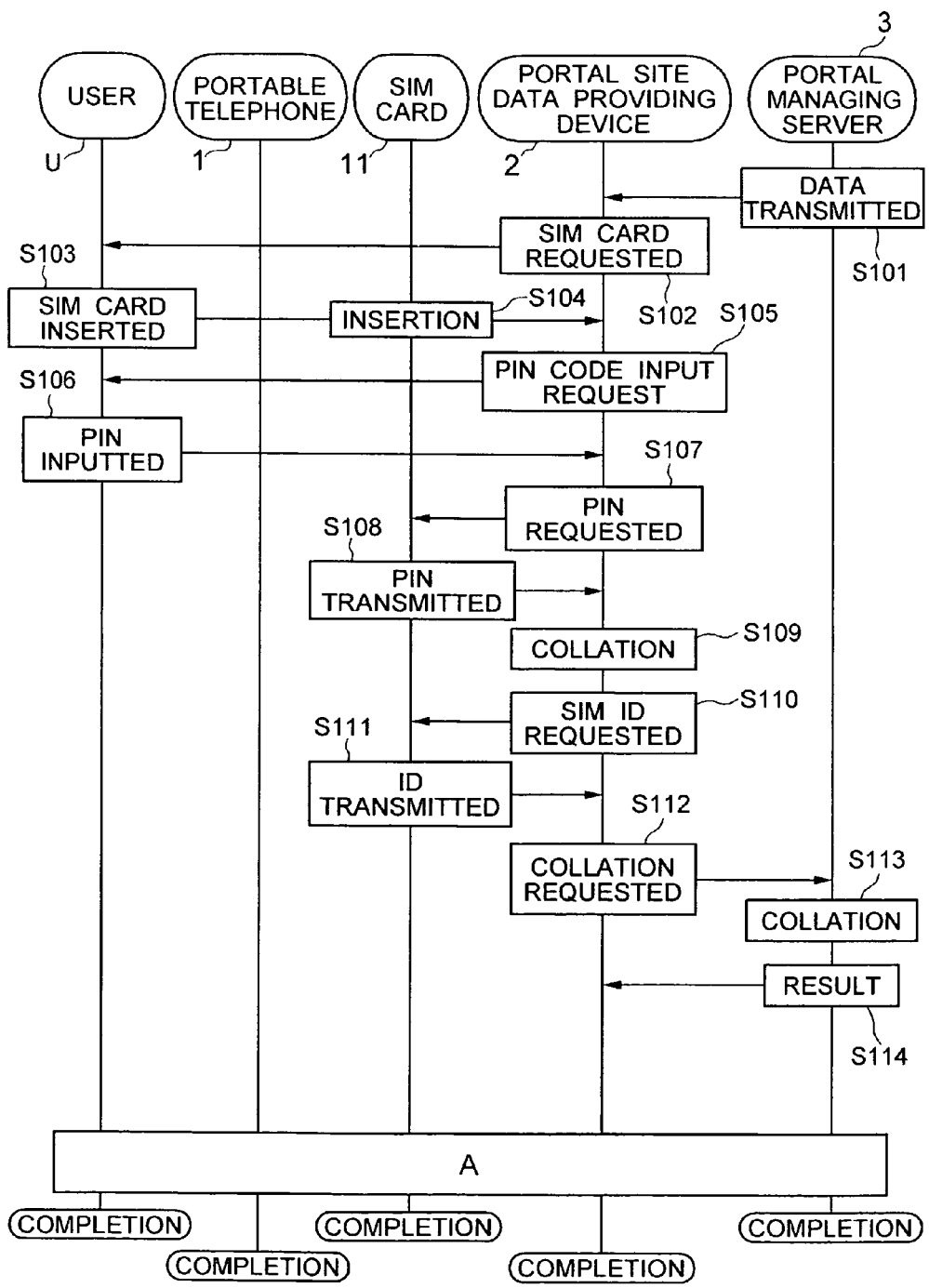
FIG. 8 is a sequence chart for showing the operation of the entire system.

Then, when determined that it is used by the user oneself, "SIM_ID" which is the data peculiar to each user is read out from the inserted SIM card (identification data reading-out step, steps S110, S111 of FIG. 8). Then, the read-out information is transmitted to the portal managing server 3 (step S112 of FIG. 8), and the SIM_ID is collated so as to check whether or not it is registered as the registered user (data collation step, step S112 of FIG. 8). At this time, as for performing the collation of the user, the data is transmitted to the portal managing server 3 to be checked whether or not it is stored in the user data storage unit 31a within the server 3 (steps S113, S114 of FIG. 8). However, the user collation may be performed by a server of the communication carrier of the portable terminal. In other words, the SIM_ID may be transmitted to the communication carrier server to be collated with the database of the user who has subscribed for the communication in advance.

When it is not registered in the portal managing server 3, new SIM_ID and a PIN code are stored in the user data storage unit 31a as the registered user, thereby completing the collation. The user authentication processing is performed in this manner (step S2 of FIG. 4). After the authentication processing is completed, the editing processing of the portal site of the user is performed (step S3 of FIG. 4). The editing processing will be described in detail by referring to FIG. 5.

Figure 13B:
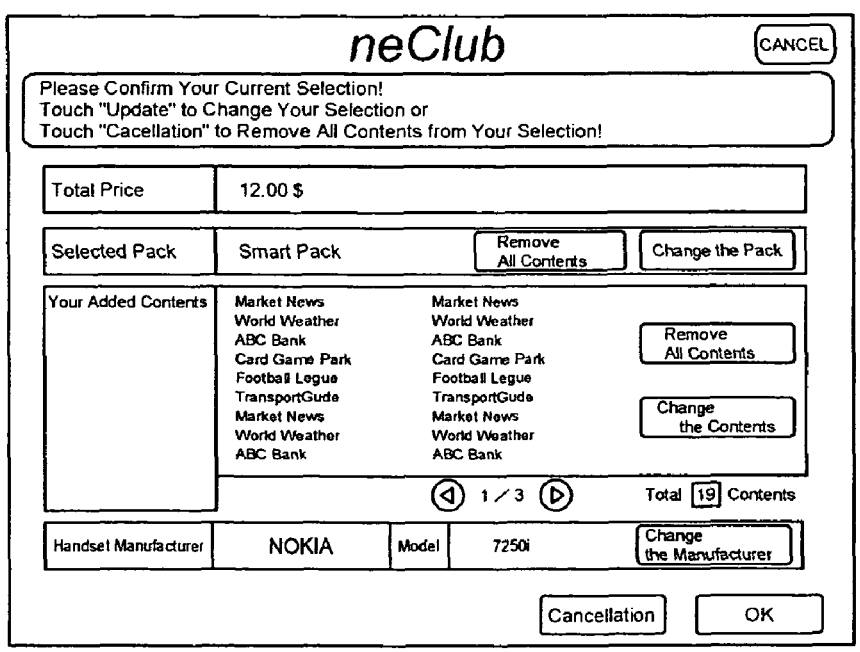
Figure 14A:
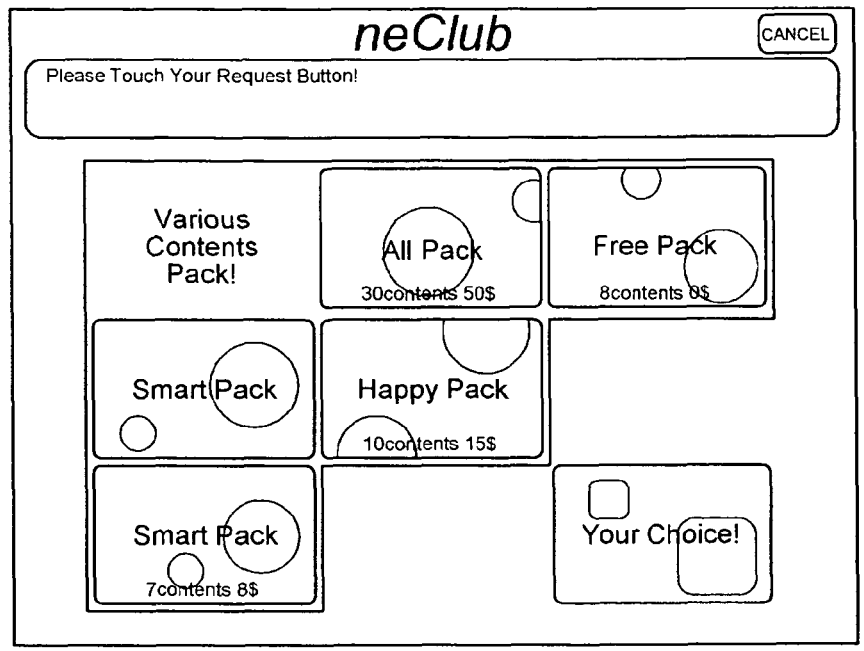
FIGS. 14A, B are illustrations for showing examples of screens displayed in the portal site data providing device.

First, if it is determined that the read-out SIM_ID is that of the already-registered user (step S11 of FIG. 5) by referring to the registered user data in the user data storage unit 31a of the portal managing server 3, the portal information of the portal site which is subscribed at present by the user is read out from the respective user portal information storage unit 31c using the SIM_ID as a key, and the contents are displayed on the screen for verification (see FIG. 13B, step S12 of FIG. 5). If there is no change necessary in the contents of the portal site (NO in step S13 of FIG. 5), it proceeds to check whether or not the present portal site is fine (step S25 of FIG. 5). In the meantime, if there is a request for changing the contents (YES in step S13 of FIG. 5) and no request for changing the course of the portal site (NO in step S14 of FIG. 5), it proceeds to the step S19 to be described later. If the courses are to be changed (YES in step S14 of FIG. 5), it proceeds to the same processing as the case of first-time subscriber and a list of the courses of the portal sites, as shown in FIG. 14A, is displayed (step S15 of FIG. 5, step S121 of FIG. 9). As for the courses of the portal sites, there are some basic courses in which the contents of the portal sites are set in advance and the types of the accessible websites vary by each of the courses.

Figure 14B:
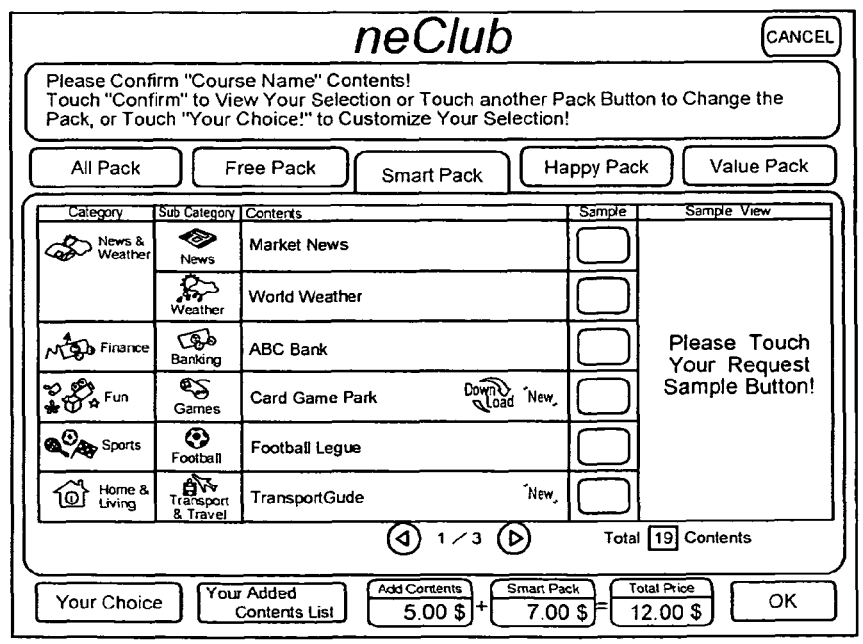

For checking the contents of each course, a button for requesting description of the course is selected (YES in step S16 of FIG. 5), so that the contents of links (a list of the linked websites) contained in advance in each course are displayed (step S17 of FIG. 5). If "Smart Pack" is selected at this time (YES in step S18 of FIG. 5, step S122 of FIG. 9), the contents contained in advance in the selected course are displayed as shown in FIG. 14B (step S19 of FIG. 5, step S123 of FIG. 9).

Figure 9:
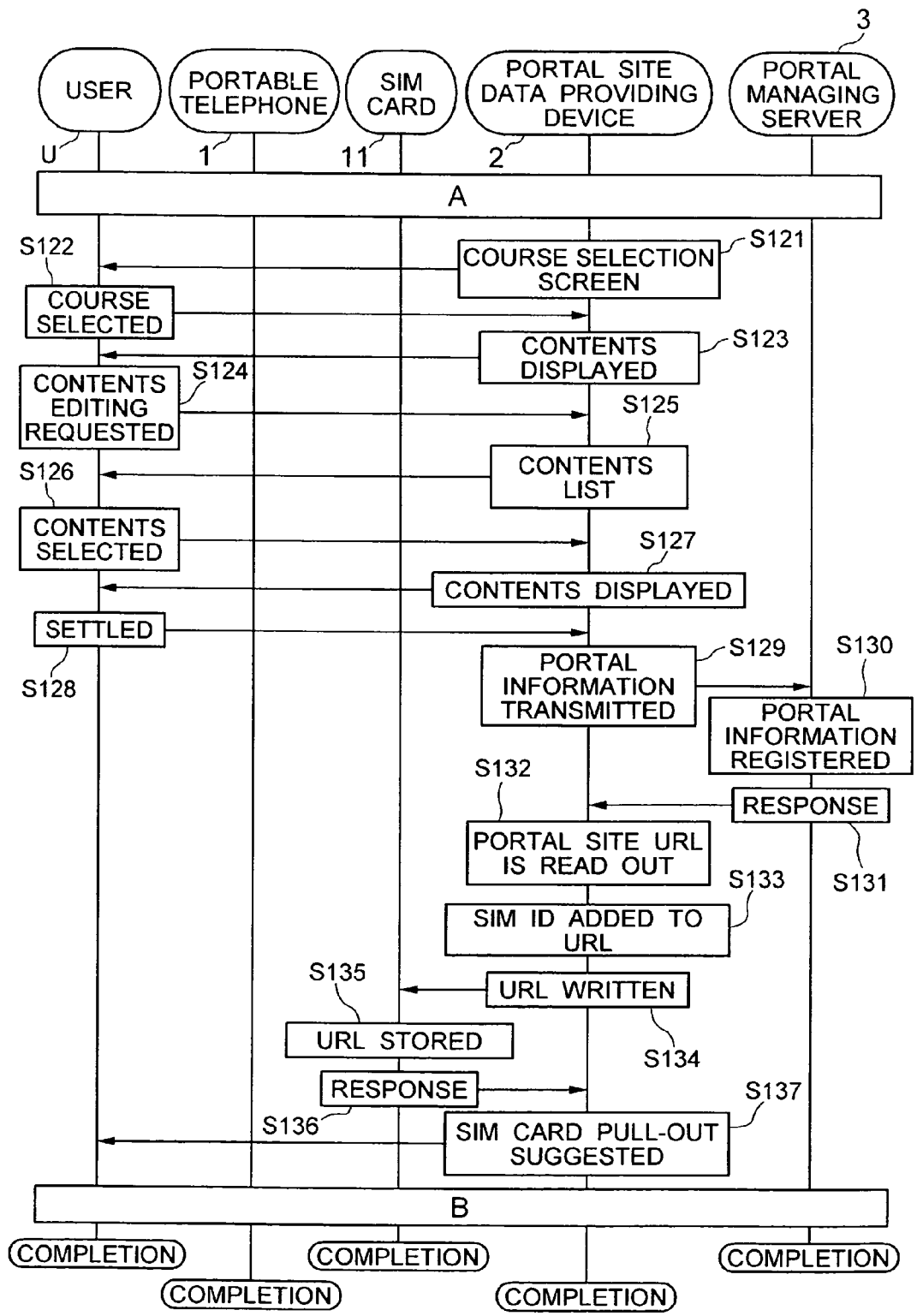
FIG. 9 is a sequence chart for showing the operation of the entire system continued from FIG. 8.
Figure 10:
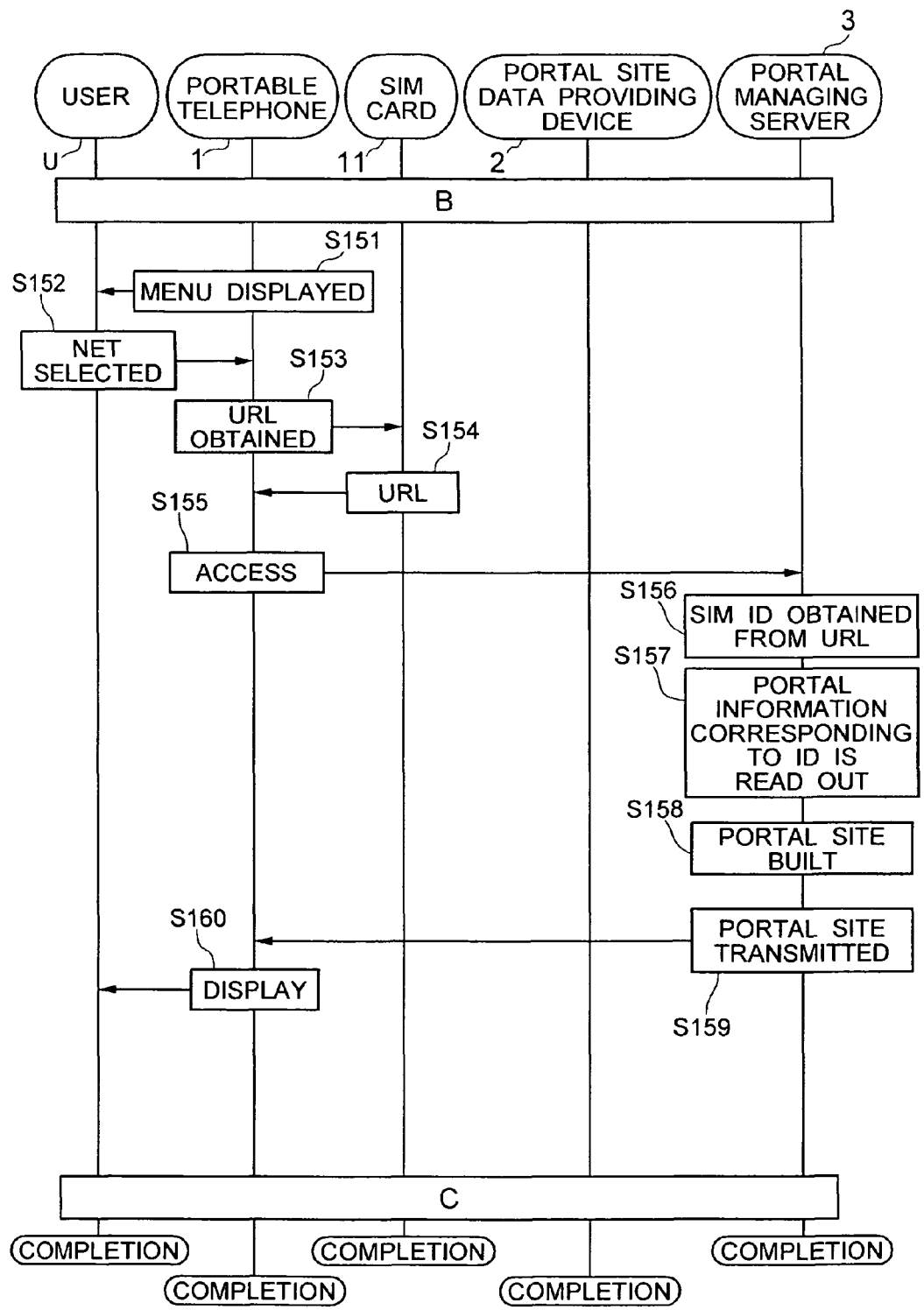
FIG. 10 A sequence chart for showing the operation of the entire system continued from FIG. 9.
Figure 15A:
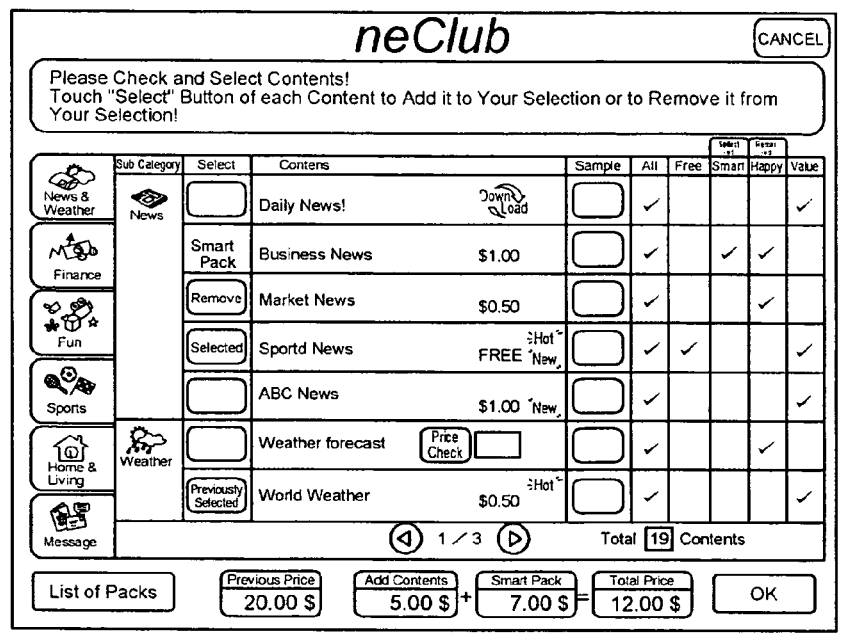
FIGS. 15A, B are illustrations for showing examples of screens displayed in the portal site data providing device.
Figure 15B:
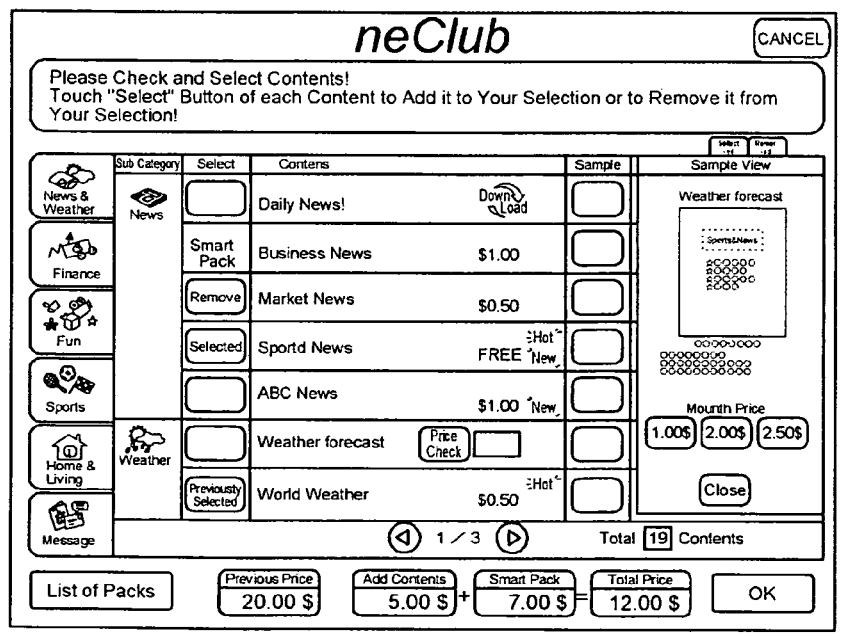
Figure 16:
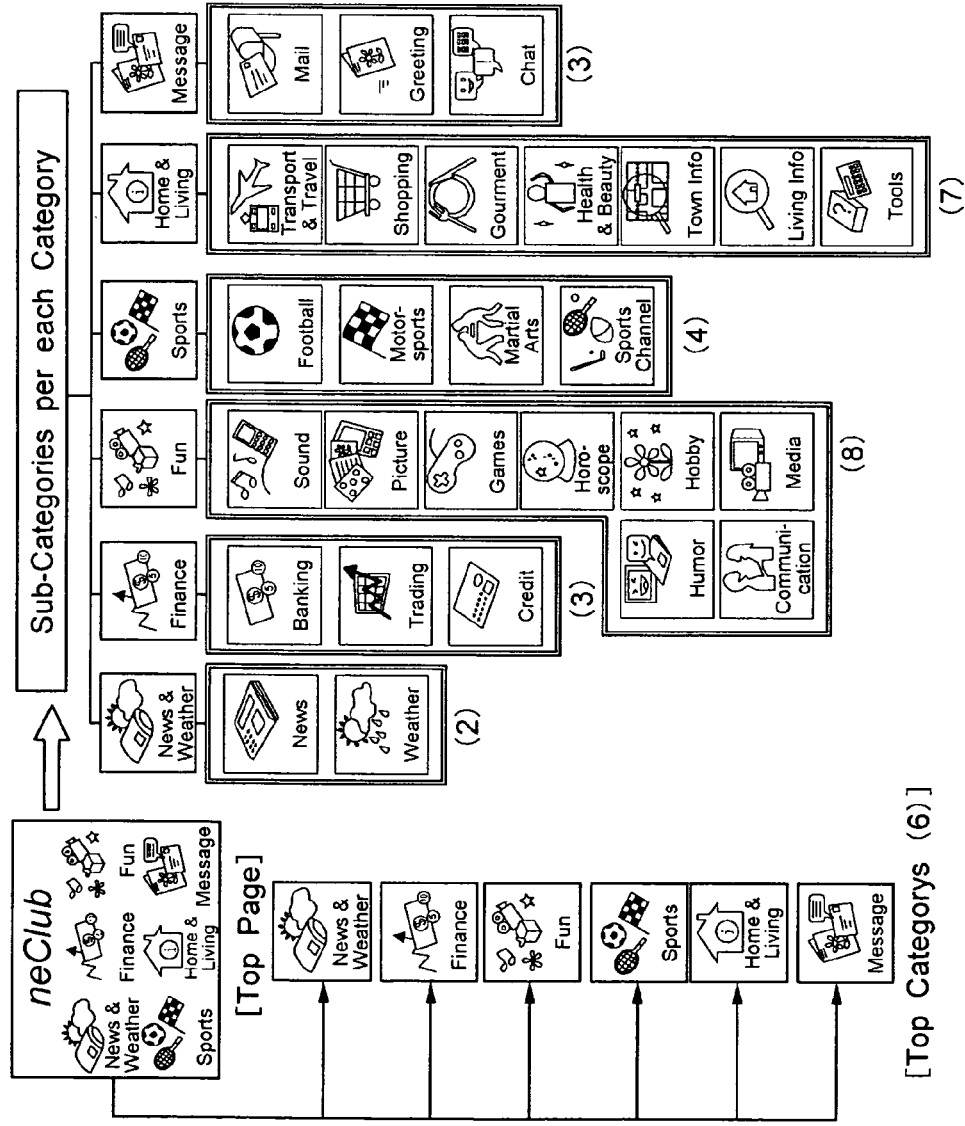
FIG. 16 is an illustration for showing a menu which can be incorporated in the portal site.
Figure 17A:
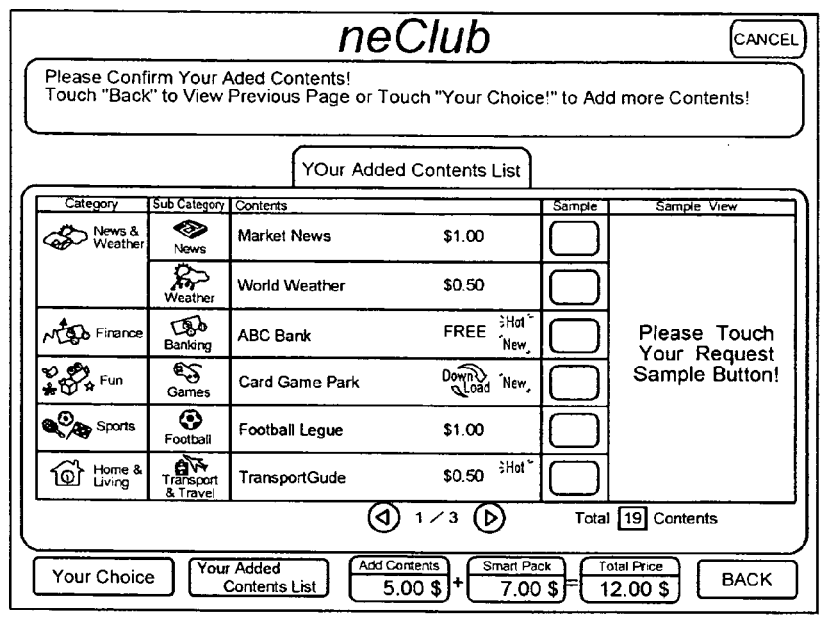
FIGS. 17A, B are illustrations for showing examples of screens displayed in the portal site data providing device.
Figure 17B:
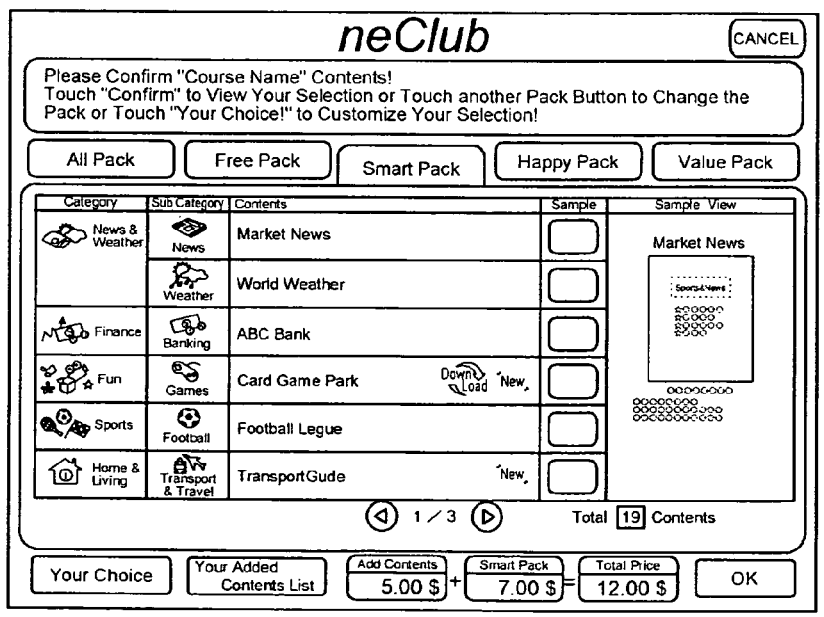

In response, if the user desires to change the contents of the selected course, the user requests editing of the contents (YES in step S20 of FIG. 5, step S124 of FIG. 9). In response to the request for editing, the portal site data providing device 2 displays a list of the contents as shown in FIG. 15A (step S21 of FIG. 5, step S125 of FIG. 9). For adding the contents, the user inputs information for selecting the contents to the portal site data providing device 2 (YES in step S22 of FIG. 5, step S126 of FIG. 9). For example, by clicking the display of respective contents, as shown in FIG. 15A, for selecting the checkbox in the section of the presently selected course, it is possible to add the link displayed in the portal site of the course (step S23 of FIG. 5). At this time, if the user desires to read the detail of the contents, by pressing the button of "Sample" as shown in FIG. 15B, an example of the screen shown in the contents and the descriptive data of the contents are displayed. The contents data at this time may be the one which is initially transmitted from the portal managing server 3, or may be the data displayed by the portal site data providing device 2, which is requested from the portal managing server 3 for each time a selection is made by the user. In the embodiment, as the contents which can be added to the portal site, there are ones shown in FIG. 16, which are provided in the top category of the hierarchy, respectively. That is, when the portal site is displayed, first, six categories are shown on the top page, and by selecting a category, the menu of the selected category is to be displayed.

Upon receiving the information from the user for selecting the contents, the portal site data providing device 2 displays the menu of the portal site reflecting the contents of the received information, such as the details of the added contents (FIG. 17A) and a menu list of the portal sites to which the details of the contents (FIG. 17B) are inserted (step S24 of FIG. 5, step S127 of FIG. 9). When the user desires to change the contents after viewing the menu, the user inputs the request for editing (changing) the contents again for adding or canceling the contents (NO in step 25 of FIG. 5) as described above.

Figure 18A:
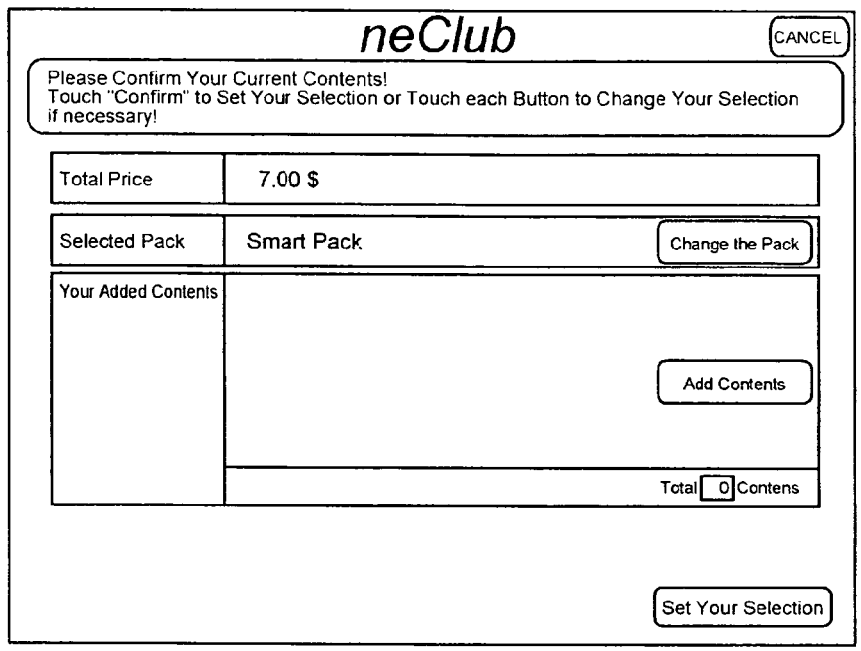
FIGS. 18A, B are illustrations for showing examples of screens displayed in the portal site data providing device.
Figure 18B:
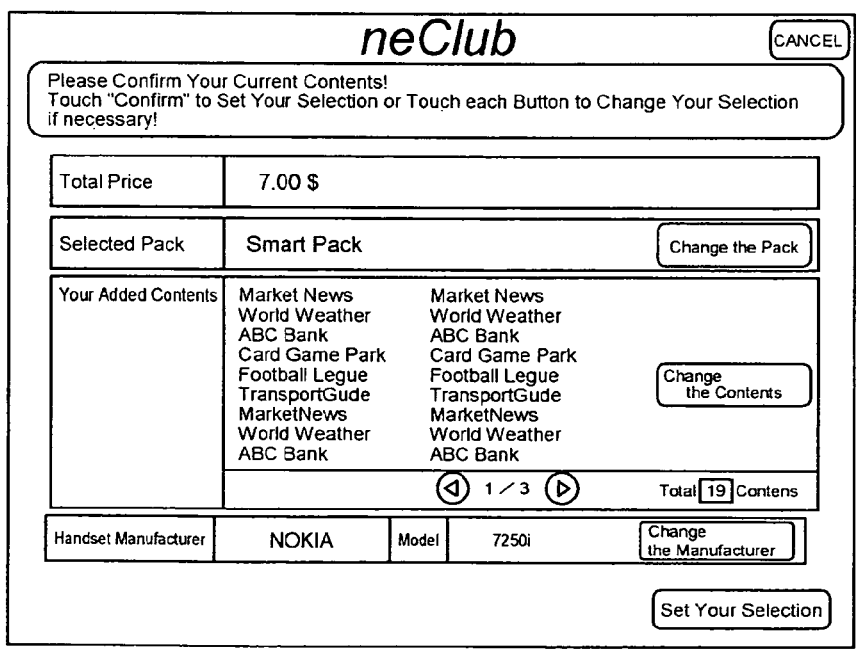
Figure 19A:
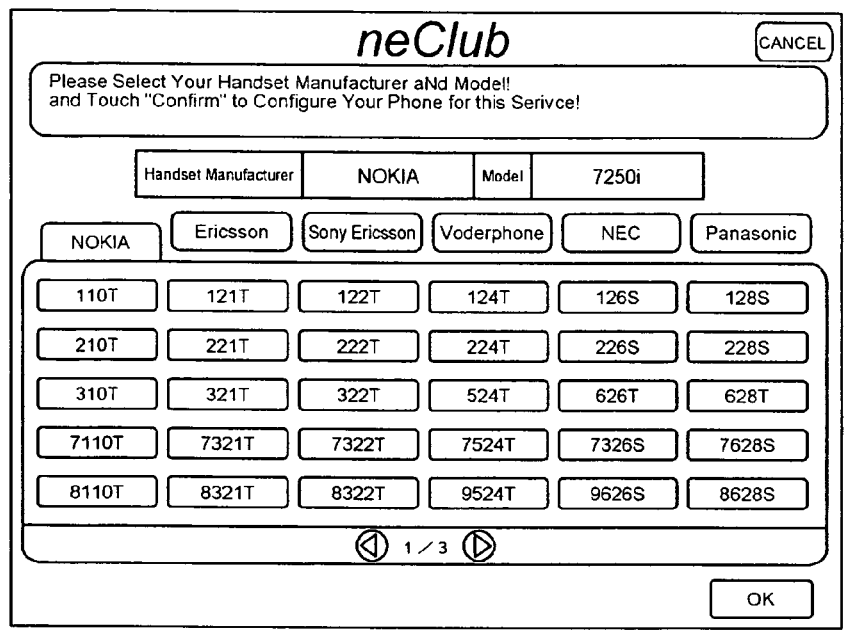
FIGS. 19A, B are illustrations for showing examples of screens displayed in the portal site data providing device.
Figure 19B:
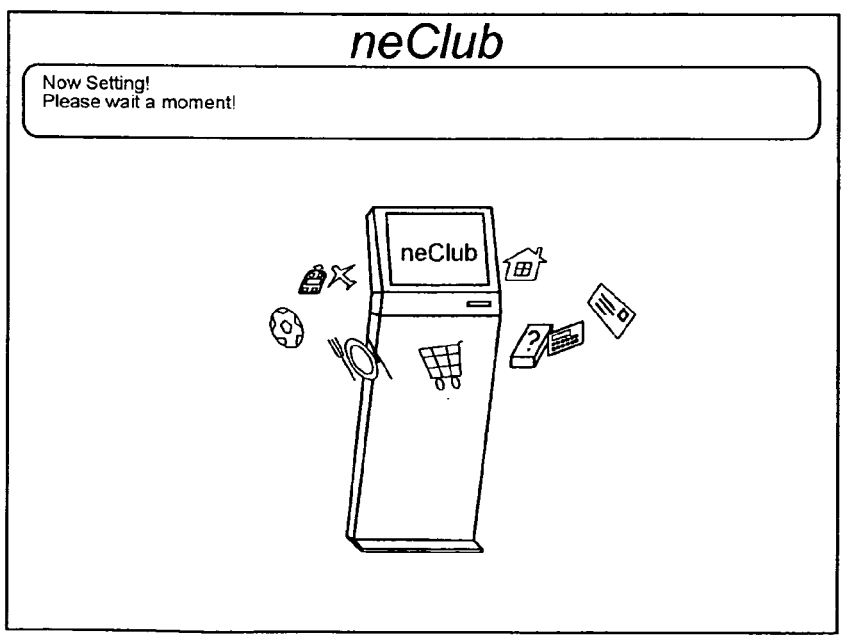

After completing the editing of the contents, the user presses the "OK" button on the screen of the portal site data providing device. Thereby, as shown in FIG. 18A, FIG. 18B, the contents of the portal site selected by the user can be displayed. By settling it as the final decision (step S128 of FIG. 9), the portal site being selected so far, that is, the portal site containing the menu of each contents site, can be determined (step S26 of FIG. 5). At this time, as shown in FIG. 19A, a screen for inquiring the type of the terminal of the portable telephone used by the user is displayed before making the final decision, and the user inputs the terminal information in response. Upon this, the confirmation screen (FIG. 18B) to which the information is reflected is displayed.

Subsequently, in the portal site data storage device 2, the information for selecting the determined portal site, that is, the portal information, is registered to the portal managing server 3 (step S4 of FIG. 4). The menu information of the portal site determined by the user, the portal information containing the contents information to be added thereto, and also the terminal information are transmitted to the portal managing server 3 along the SIM_ID from the portal site data providing device 2 (step S129 of FIG. 9), and the information along with the SIM_ID is registered to the respective user portal information storage unit 21c in the portal managing server 3 (step S130 of FIG. 9). Upon receiving the response from the portal managing server 3, the portal site data providing device 2 reads out the URL of the portal site being transmitted from the portal managing server 3 (step S132 of FIG. 9), or obtains, for the first time, the URL from the portal managing server 3 at this time and adds the encoded SIM_ID to the end of the URL (step S133 of FIG. 9) to be written to the SIM card (data writing step, step S134 of FIG. 9). Thereby, the SIM_ID is added to the end of the URL written to the SIM card, so that it becomes the URL peculiar to each user. However, at this time, the SIM_ID may not be added to the URL to be written to the SIM card. In such a case, as will be described later, an access is made to the URL through the portable telephone 1 and, at the same time, the SIM_ID is also transmitted to the access target. Thereby, it is possible for the server of the access target to recognize whom the access is made from, so that it is possible to provide the portal site peculiar to the user. The URL is for accessing to the portal managing server 3.

Figure 20A:
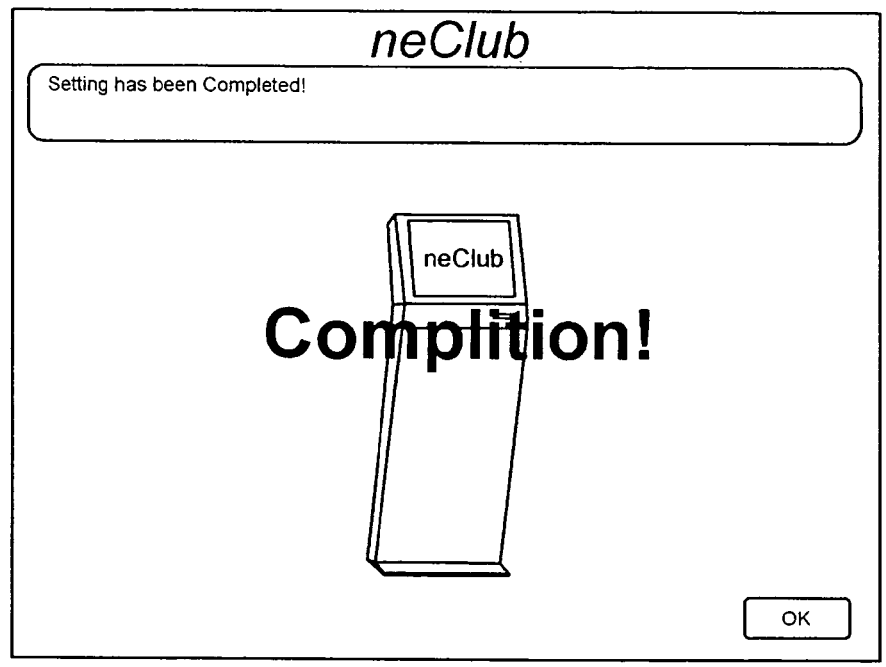
FIGS. 20A, B are illustrations for showing examples of screens displayed in the portal site data providing device.
Figure 20B:
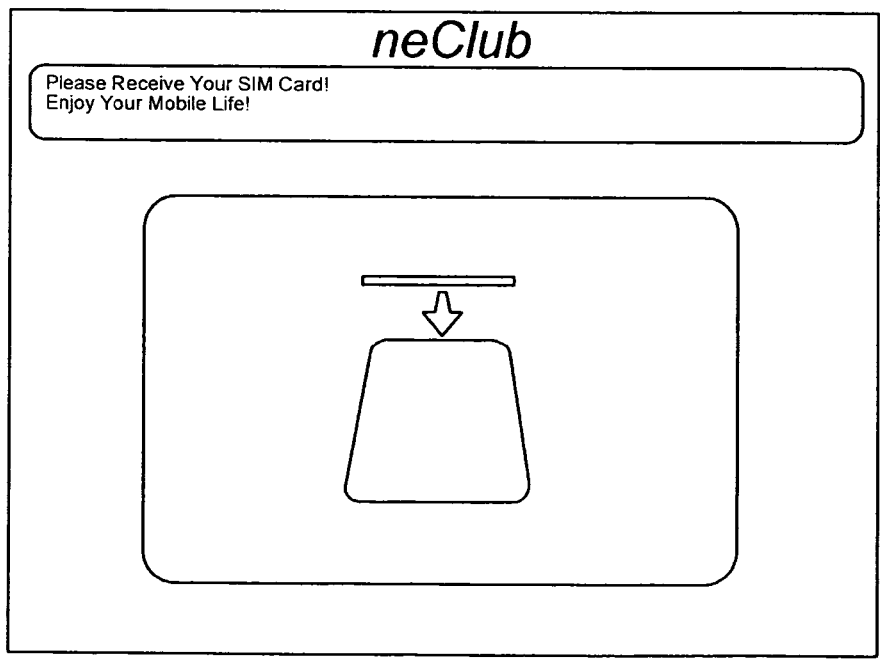
Figure 23A:
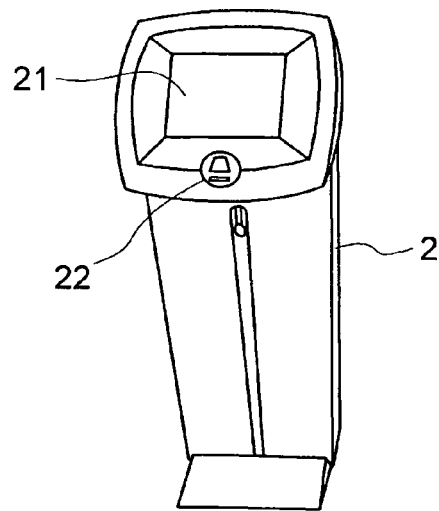
FIG. 23A is an illustration for showing the external appearance of a fee charging device of the fourth embodiment and FIG. 23B is a functional block diagram for showing the configuration.
Figure 23B:
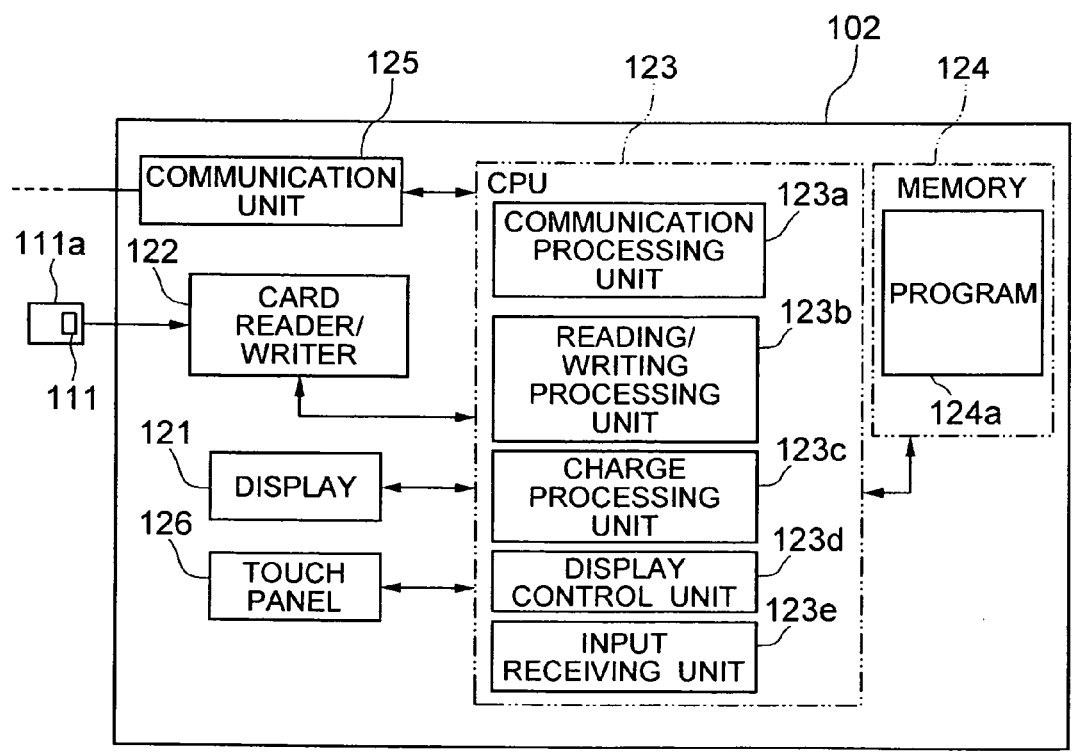
Figure 25:
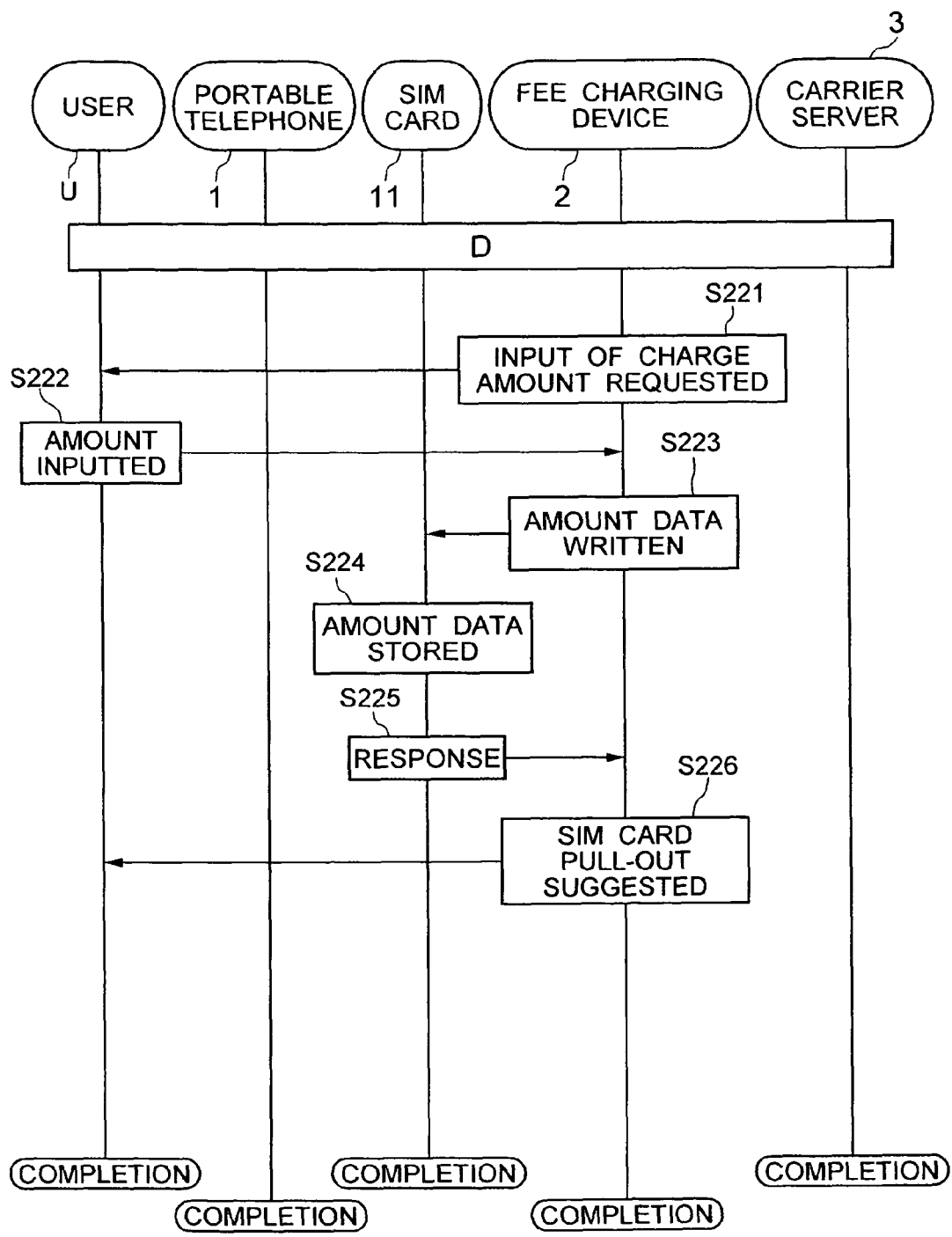
FIG. 25 is a sequence chart for showing the operation of the entire system according to the fourth embodiment continued from FIG. 24.

During the time of recording it to the SIM card as described above, the screen as shown in FIG. 19B is shown on the display of the portal site data providing device 2. When the URL is actually written to the SIM card (step S135 of FIG. 9), and the response data is received after completing the writing (step S136 of FIG. 9), the writing completion screen as shown in FIG. 20A is displayed. Then, as shown in FIG. 20B, a screen for suggesting to pull out the SIM card is displayed (step S137 of FIG. 9).

Thereby, it is possible for the user to easily set the portal site containing the website desired by the user oneself while viewing the screen displayed in the portal site data providing device 2 and to record the URL of the sites to the memory medium of the own portable terminal. Accordingly, it enables to obtain the data easily and promptly without operating the small operation unit of the portable terminal.

Next, by referring to FIG. 10, FIG. 11 and FIG. 6, FIG. 7, described are the operation of the entire system and the operation of the portal managing server 3 at the time of making an access to the URL after the URL of the user's personal portal site is recorded in the memory medium of the portable telephone 1 as described above.

Before that, the operation of the portal managing server 3 with respect to the portal site data providing device before being accessed by the user will be described briefly. First, the portal managing server 3 always receives the contents which can be added to the portal site. That is, it receives a portal site adding request by receiving an access from another contents server 4, which is, specifically, from the administrator of the contents server 4. When a specific condition is satisfied, it is registered as the contents site which can be additionally added to the portal site and the URL of the contents site, the text data of the detail of the contents, sample screen data and the like are stored in the contents data storage unit 31d (contents managing processing, step S31 of FIG. 6). The data is managed in the contents managing unit 32d, and is transmitted to the portal site data providing device 2 along with the screen data to be displayed in the device 2 and a program for controlling the display of the data (portal site data transmission processing, step S32 of FIG. 6). Further, as described above, performed is the portal information registration/update processing (step S33 of FIG. 6) for receiving and registering the portal information showing the contents of the portal site selected and set by each user, which is transmitted from the portal site data providing device 2.

Thereafter, when there is an access from the user through the portable telephone 1, the processing for distributing the portal site peculiar to the user is performed (step S34 of FIG. 6). The operation will be described in detail. First, when the user selects the Internet connection (step S152 of FIG. 10) from the top menu showing the functions of the portable telephone 1 (step S151 of FIG. 10), the terminal of the portable telephone 1 reads out the URL recorded by the portal site data providing device 2 as described above from the SIM card (steps S153, S154 of FIG. 10). Using the URL, an access is made to the portal managing server 3 as the connection target of the URL (step S155 of FIG. 10). There are portable terminals which do not read out the URL stored in the SIM card at the time of making an access to the Internet depending on its type. Therefore, there may be cases where the portal managing server 3 distributes the URL accessible to the portal site to the portable telephone 1 of the user through a short mail service (SMS) or an E-mail based on the information on the types of the portable terminal inputted by the used as described above. In this case, the URL stored in a local region is read out and an access is made according to this.

Then, when there is an access from the portable telephone 1 (YES in step S41 of FIG. 7), the portal managing server 3 extracts the SIM_ID included in the end of the received URL (step S42 of FIG. 7, step S156 of FIG. 10), or it receives the SIM_ID along with the URL. It then reads out the portal information of the ID or information related to the ID by referring to the SIM_ID (step S43 of FIG. 7, step S157 of FIG. 10). Thereby, the portal information of the user who is making an access can be read out. The portal site is built (step S44 of FIG. 7, step S158 of FIG. 10) according to the read-out portal information and the portal site building data. At this time, for example, if it is the portal site in which no change is applied in the course prepared in advance, this site is used since it is prepared in advance as the portal site building data. When there are additional contents, the link which is the address data of the contents site stored in the contents data storage unit is added to the portal site of each course as the base so as to build the portal site which is appropriate for each user. Then, the data of built portal site is distributed to be displayed on the display unit of the portable telephone 1 (step S45 of FIG. 7, step S159 of FIG. 10). At this time, the above-described portal information contains the information regarding the type of the portable telephone 1. Thus, at the time of building, it is built by adjusting the screen size and the like so that the screen display becomes appropriate for each type. Therefore, in the portable telephone 1, the portal site can be appropriately displayed and the user can view the site (step S160 of FIG. 10).

Next, described is the processing operation at the time of making an access to each contents site from the displayed portal site (step S35 of FIG. 6). First, the user selects a menu item from the portal site and if it is a subcategory (YES in step S46 of FIG. 7), a page (site) of the subcategory for displaying the contents site included in the subcategory is built by referring to the portal information (step S47 of FIG. 7). Then, the page is distributed (step S48 of FIG. 7).

Figure 11:
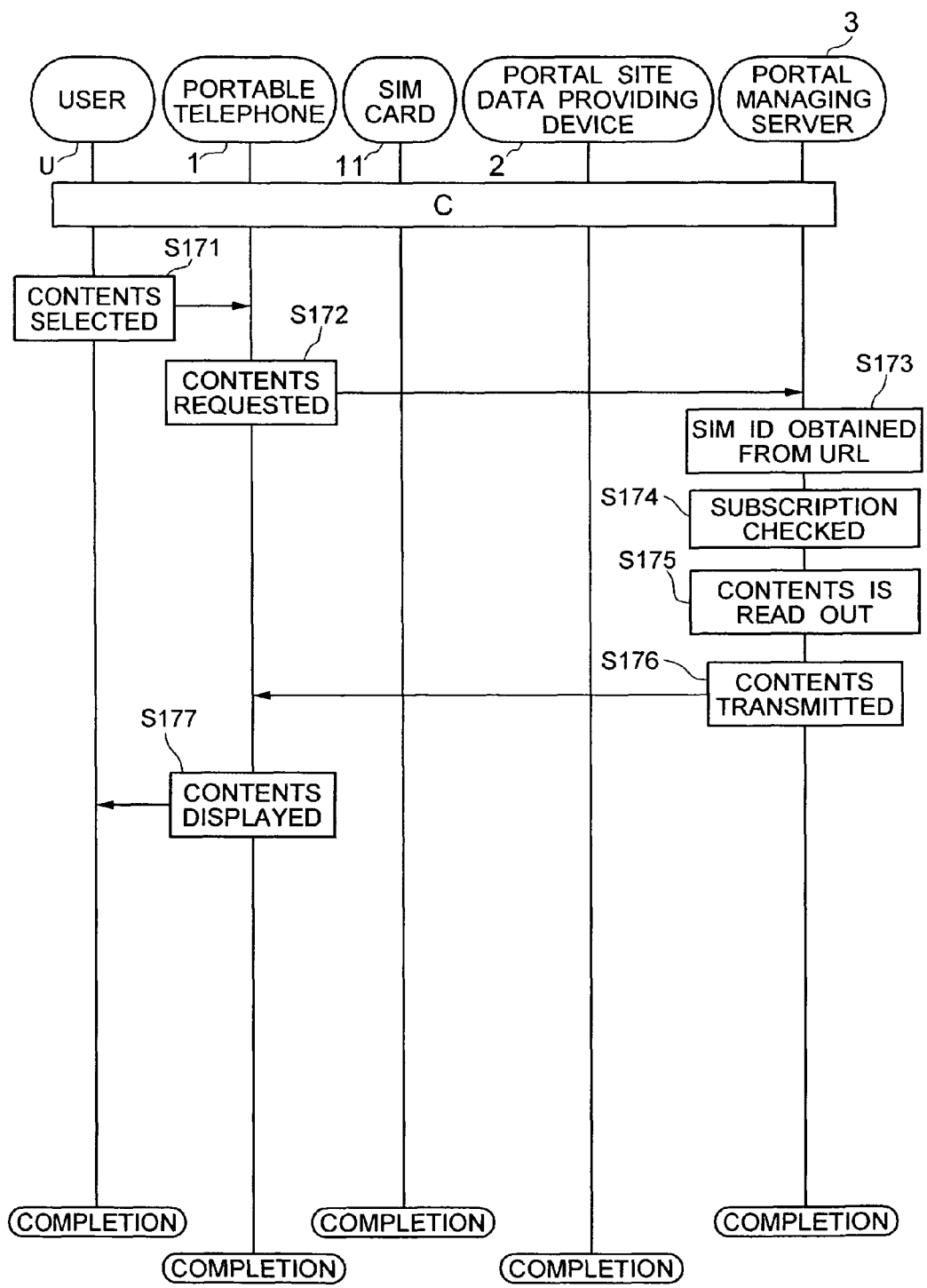
FIG. 11 A sequence chart for showing the operation of the entire system continued from FIG. 10.

After that, when the main page of the portal site or the link of the contents site displayed in the subpage is selected (YES in S49 of FIG. 7, step S171 of FIG. 11), the data for requesting the contents is transmitted to the portal managing server 3 from the potable telephone 1 (step S172 of FIG. 11). Upon receiving it, the portal managing server 3 reads out the SIM_ID of the user from the URL. If it has already been read out, the SIM_ID on the buffer memory is obtained (step S173 of FIG. 11). Then, the SIM_ID and the data within the contents data storage unit 31d are referred for checking whether or not the user has already subscribed for using the selected contents (step S50 of FIG. 7, step S174 of FIG. 11). When it is judged that the user has subscribed (YES in step S51 of FIG. 5), an access is made to the contents server according to the URL of the contents for obtaining the required contents (step S52 of FIG. 7, step S175 of FIG. 11). By distributing the contents to the portable telephone 1 (step S53 of FIG. 7, step S176 of FIG. 11), the user can read the contents through the display unit of the portable telephone 1 (step S177 of FIG. 11).

In the above, after receiving the contents once in the portal managing server from the contents server, the contents are distributed to the portable telephone 1. Thereby, the portal managing server 3 functions as a proxy server so that it is possible to transmit/receive data promptly. At the same time, when it is a pay site with a charge, as described above, the fee can be charged through the portal site data providing device 2 at the time of selecting the portal site. Therefore, it becomes unnecessary to subscribe and charge a fee for each contents site.

Thereby, the user can input the contents of the one's desired portal site through the portal site data providing device 2, and the URL of the portal site to which the contents are reflected is automatically stored in the recording medium such as the SIM card. Thus, only the URL which is accessible to the target portal site is stored in the memory of the portable terminal and a customized portal site can be easily formed. Especially, by storing the URL of the portal site along with the own ID number, the ID data is automatically transmitted to the portal managing server 3 when making an access using the URL. Thereby, the portal managing server 3 can identify the user who is making the access, so that the portal site peculiar to the user can be built to be distributed. Thus, the convenience for the user is improved. At the same time, since it is only displayed to the respective user so that the security can be improved.

The above-described embodiment has been described by referring to the case where the website (contents) linked from the site can also be selected in the portal site selected and specified by the user through the portal site data providing device. However, it is not necessarily limited to this. Simply, there may be a plurality of portal sites (not limited to the case where the sites are in the portal managing server 3) being prepared, and a single portal site thereof is selected among them and the URL may be stored in the SIM card. Thereby, it is also possible to obtain the URL of the portal site desired by the user without operating the portable terminal and the operation thereafter becomes easy. The memory medium of the portable telephone to which the URL is stored is not limited to the SIM card. It may be other memory medium such as an SD card.

Second Embodiment

Next, a second embodiment of the present invention will be described by referring to FIG. 21. In the embodiment, the configuration of the data reading/writing device provided to the portal site data providing device 2 is different from that of the first embodiment. That is, it is not formed by the card reader/writer 22 as shown in FIGS. 2A, 2B. For example, it may be formed by a noncontact short-distance communication device such as an infrared port 22' (see FIG. 21A) which performs reading/writing of data from/to the memory medium built in the portable telephone 1 through the infrared communication, or a connecting device 22" (see FIG. 21B) connected to a connecting terminal of the portable telephone 1. As described above, it is possible to store the portal site data without taking in/out the memory medium such as the SIM card to/from the portable telephone 1. Therefore, the convenience can be more improved.

Third Embodiment

Next, a third embodiment of the present invention will be described. The embodiment is different from the above-described embodiments in respect that the data to be stored in the memory medium of the portable telephone by the portal site data providing device 2 is not the URL of the portal site but the portal screen data for locally building the portal site.

Therefore, in the embodiment, the portal site data providing device 2 stores the portal screen data for building the portal screen data. Further, built in the CPU is a portal screen data building processing unit for building the portal screen data according to the portal information inputted by the user. The built portal screen data is stored in the SIM card as the memory medium of the portable telephone 1 or stored directly to the built-in memory of the portable telephone.

Thereby, the portal screen data in which the links of the address data of the various websites selected by the user are collected is built and it is stored in the portable terminal. Thus, the portal screen displaying the links to the websites as the one's selected menu is displayed on the portable terminal so that the user-friendly portal screen for the user is displayed at the time of connecting to the network without operating the portable terminal in advance for setting the portal site in which the links to the one's desired sites are prepared. Therefore, it enables to make an access to each site displayed thereby.

In the case where the website in a registration system with the user authentication is included in the portal site, the SIM_ID as the identification data of the user is read out from the SIM card in which the portal screen data is stored to be transmitted to the website when an access is made to the website in a registration system. Thus, the user authentication processing becomes easy and the convenience for the user can be improved while maintaining the security.

Fourth Embodiment

Next, the fourth embodiment of the present invention will be described by referring to FIG. 22-FIG. 25. The data writing system for a portable terminal memory according to the fourth embodiment comprises: a portable telephone 101 as a portable terminal owned by a user; a fee charging device 102 which enables to pay the communication fee to the portable telephone 101; and a communication carrier server 103 which is connected to the fee charging device 102 through a network. Accordingly, when the identification data of the user stored in the memory medium is registered as the user registration data in the portal managing server, the fee deposit information is stored in the memory medium by the fee charging device 102 and the communication carrier server 103. Thereby, it functions as the data writing device for a portable terminal memory.

In accordance with this, the registration data of the user who has subscribed for the portable telephone is also stored within the communication carrier, that is, within the user database 131 connected to the communication carrier server 103. Further, a charge processing unit 123c is provided to a CPU 122 of the fee charging device 102 for performing collation of the identification data read out from the memory medium by the reading/writing processing unit 123b and then the data storage processing.

(Operation)

First, when subscribing for the portable telephone 101 for the first time, the user of the portable 101 obtains an SIM card 111 to be used therewith. In the initial state, the SIM card 111 is mounted to a card holder 111a. Although the newly subscribed user will be mainly described in the followings, the case of a user who has already used the system will be described as well. In that case, the SIM card 111 needs to be mounted to the card holder 111a and inserted to the portal site data providing device 102.

The user uses the fee charging device 102 for depositing the one's desired communication fee to the SIM card 111. The operation of the fee charging device 102 is achieved by a program stored in advance. However, there may be another computer on the network N for managing the fee charging device 102 so that the program may be provided therefrom.

When the user touches a display 121 of the fee charging device 102, first, a screen for requesting the insertion of the SIM card is displayed on the display 121 of the fee charging device 102 (step S201), so that the user inserts the SIM card to the card reader/writer 122 (see FIG. 23A) according to the SIM card inserting command (steps S202, S203). Upon this, the fee charging device 102, to which the SIM card is inserted, requests a user U to input the PIN code of the SIM card (step S204). In response, the user inputs the PIN code (step S205), the fee charging device 102 stores it and also reads out the PIN code stored in the SIM card inserted to the card reader/writer 122 (steps S206, S207), and checks whether or not it is the same as the one inputted by the user (step S208). Thereby, the authentication processing of the SIM card user is performed, so that a proper use by the user having the SIM card is achieved and the security can be improved.

Then, when determined that it is used by the user oneself, the "SIM_ID", which is the data peculiar to each user, is read out from the inserted SIM card (steps 209, S210). Then, the read-out information is transmitted to the communication carrier server 103 (step S211), and the SIM_ID is collated so as to check whether or not it is registered in the communication carrier server 103 as the registered user. Thereby, in the communication carrier server 103, it is possible to collate whether or not it is the user who has subscribed for using the service of the portable telephone, and the result is informed to the fee charging device 102 (steps S212, S213). At this time, the fee charging device 102 does not charge the communication fee from the user who is not authenticated to be a subscribed user.

If the SIM_ID is registered in the communication carrier server 103, subsequently, a screen for requesting an input of the communication fee to be charged is displayed in the fee charging device 102 (step S221). In response, the user inputs the amount to be deposited in advance as the communication fee through the touch panel 126 of the fee charging device 102 (step S222). Upon this, the fee charging device 102 writes the amount data onto the SIM card 111 (step S223) to be stored in the SIM (step S224). Then, upon receiving the response from the SIM card for informing the completion of the writing (step S225), the SIM card pull-out command is displayed on the fee charging device 102 (step S226), and upon this, the user pulls out the SIM card. If necessary, cash in the amount inputted to the fee charging device 102 for the deposit is inserted into the fee charging device 102.

Subsequently, the user mounts the SIM card to the portable telephone 101 for using the communication services such as talking on the phone and the network communication. At this time, if the user dials to start the communication, the communication fee is charged to the user. Thus, the communication fee in accordance with the used communication time or the communication data amount is subtracted from the communication fee data stored in the SIM card for updating the communication fee data. At this time, the subtraction processing of the communication fee may be performed with a consideration on the communication time and the like, or the communication fee which is calculated and informed by the communication carrier may be subtracted later in the portable telephone 101.

Thereby, the authentication is performed for checking whether or not the SIM_ID (identification data) for indicating that it is the subscribed user is stored in the memory medium of the portable terminal. And only when it is consistent, the communication fee can be deposited in advance and the data is stored in the SIM card. Thus, thereafter, the SIM_ID required for communication and the communication fee is read out from the SIM card to be transmitted to the communication carrier for achieving the communication. As described above, the communication fee data which is the data required to be used in association with the identification data is surely stored in the memory medium so that it is possible for the user to talk on the phone or achieve the communication using the recorded communication feed at a thereafter. At the time of writing data, it is possible to suppress other users to manipulate the data within the memory medium and also to enables to suppress the user oneself to carelessly alter the identification data within the memory medium. Therefore, it is possible to surely store the necessary data in the own terminal while maintaining the security and the convenience for the user can be improved. Further, by using such device, it is possible to easily perform the data input without operating the operation unit mounted to the portable terminal, which is hard to perform the input.

Fifth Embodiment

Figure 26A:
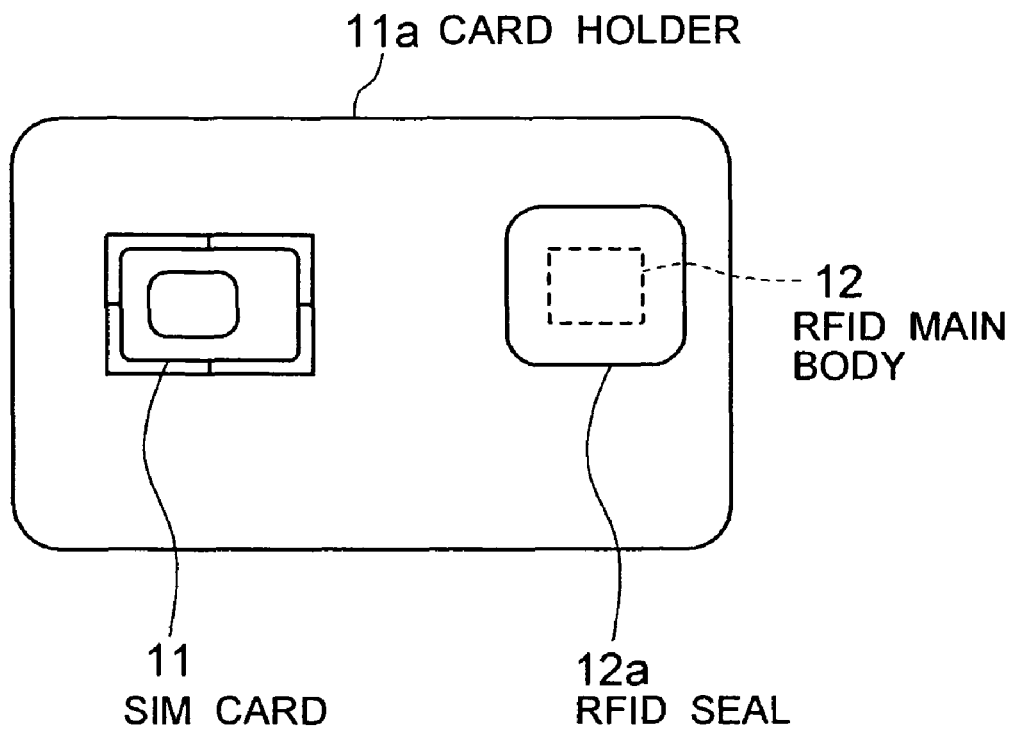
FIGS. 26A, B are illustrations for describing the configurations of the memory medium and the noncontact memory medium used in a fifth embodiment.
Figure 28:
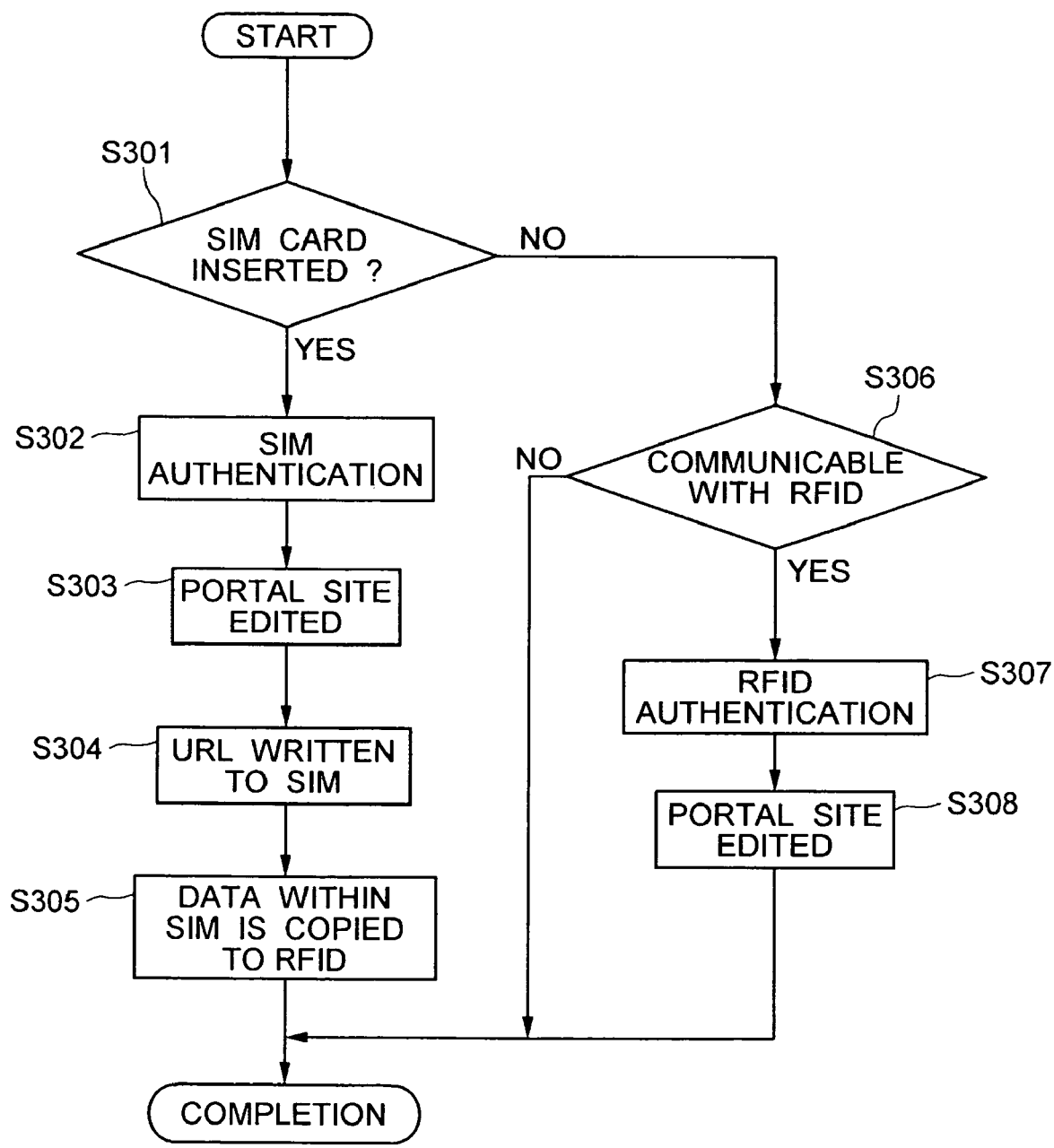
FIG. 28 is a flowchart for showing the operation of the portal site data providing device 2 according to the fifth embodiment.
Figure 29:
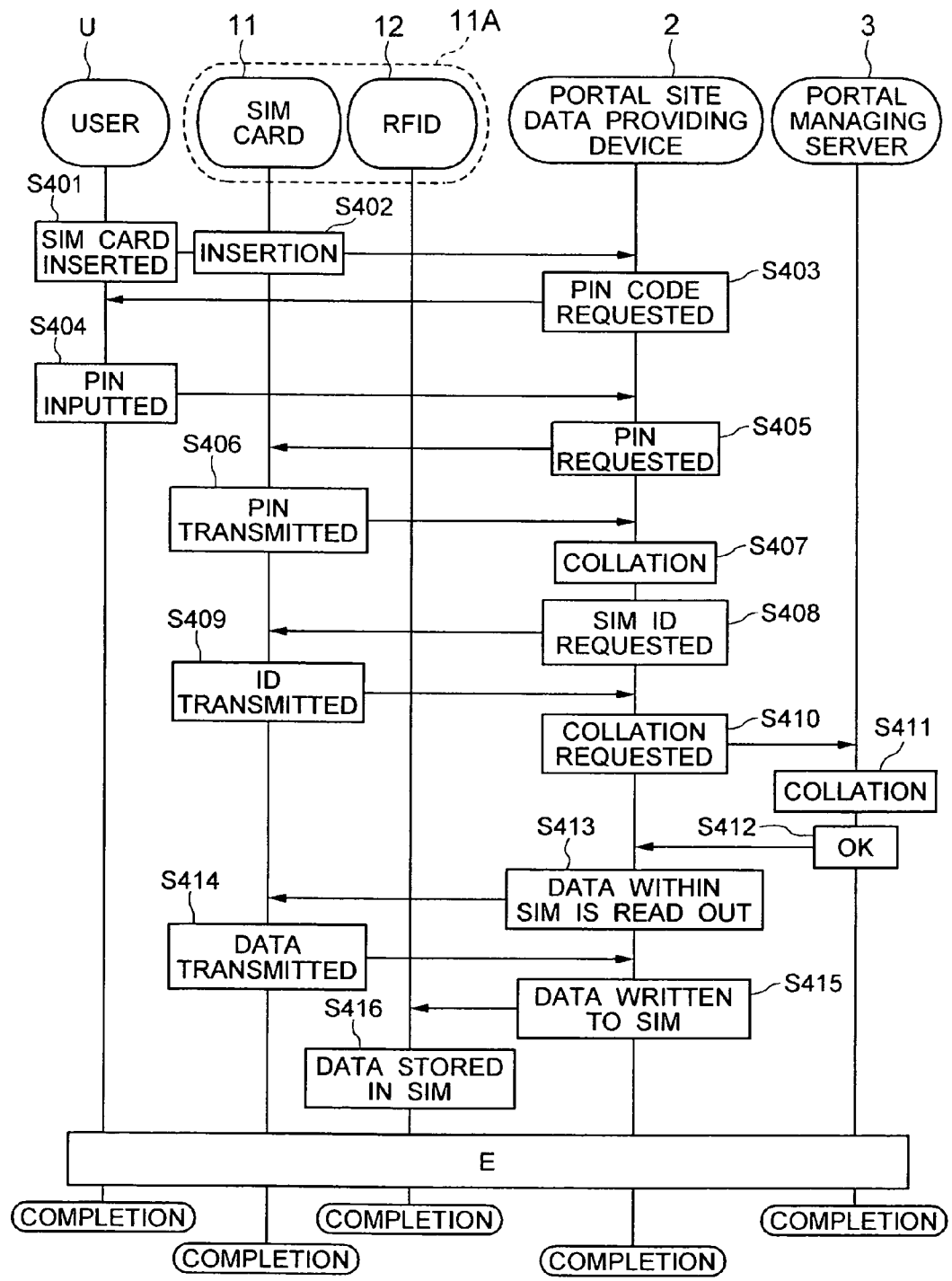
FIG. 29 is a sequence chart for showing the operation of the entire system according to the fifth embodiment.

Next, the fifth embodiment of the present invention will be described by referring to FIG. 26-FIG. 30. FIG. 26-FIG. 27 are illustration for describing the configuration of the embodiment. FIG. 28-FIG. 30 are illustrations for showing the operation of the embodiment.

(Configuration)

In the embodiment, as in the above-described embodiments, the memory medium to which the user identification data is stored is the SIM card used in the GSM-type portable telephone. The SIM card is a memory medium which achieves contact reading/writing. In addition, a RFID tag 12 which enables noncontact reading/writing of data is used in the embodiment. As shown in FIG. 26, the RFID tag 12 is formed by a thin seal 12a with a built-in RFID main body 12, which has a adhesive face to be affixed to the portable telephone 1. The RFID seal 12a is provided by being affixed to a card holder 11a which protects the SIM card 11.

In accordance with this, provided to the portal site data providing device 2 is a RFID reader/writer 22 capable of reading/writing the data from/to the RFID 12 which is provided to the card holder 11a. The RFID reader/writer 22 is integrally formed with the reader/writer 22 or provided nearby. Thereby, the portal site data providing device 2 copies the data within the SIM card 11 when reading/writing the data from/to the SIM card 11 as described above, and it is written to the RFID main body 12 built in the RFID seal 12a provided to the card holder 11a by the RFID reader/writer 22.

The RFID seal 12a, in which the data within the SIM card 11 is copied as described above, is affixed to the rear face or the like of the portable telephone 1 by the user as shown in FIG. 27A. In accordance with this, the RFID reader/writer 222 for reading/writing the data from/to the RFID 12 as the noncontact memory medium is additionally provided to the portal site data providing device 2 like the one shown in the first embodiment. For example, it is provided within a concave part (222) for placing the portable telephone 1 as shown in FIG. 27B. Thereby, various types of data are read out from the RFID 12 affixed to the portable telephone 1 placed in the concave part (222). The RFID reader/writer denoted by 222 may be the same RFID reader/writer which is provided for the SIM card 11 with the card reader/writer or may be different.

When the portal site data providing device 2 recognizes the portable telephone 1 to which the RFID 12 is mounted, it reads out the data stored in the RFID 12. For example, if the SIM_ID is stored, the portal site data providing device 2 reads it out and requests the collation processing to the portal managing server 3. When it is determined to be consistent as a result of the collation processing, log-in is allowed for enabling to change the structure of the portal site as described above or for enabling to perform other processing.

(Operation)

Next, the operation of the system of the embodiment, specifically, the operation of the portal site data providing device 2 will be described by referring to FIG. 28-FIG. 30. FIG. 28 is a flowchart for showing the operation of the portal site data providing device 2. FIG. 29 and FIG. 30 are sequence charts for showing the operation of the entire system.

First, when a user purchase an SIM for the first time and inserts the SIM card 11 (card holder 11a) to the card reader/writer 22 the portal site data providing device 2 for making a new portal site of oneself (YES in step S301 of FIG. 28, steps S401, 402 of FIG. 29), the portal site data providing device 2 performs authentication of the SIM card 11. Specifically, as described above, performed is the authentication of the PIN code for the user and the SIM card (steps S403-S407 of FIG. 29) and the authentication of the SIM_ID for the SIM card (steps S408-S410 of FIG. 29). At this time, the authentication processing is performed using the portal managing server 3 (steps S411-S412 of FIG. 29).

When the authentication is succeeded, subsequently, the portal site data providing device 2 edits the portal site according to the input from the user (step S303 of FIG. 28) and the address data (URL) accessible to the portal site is written onto the inserted SIM card 11 through the card reader/writer 22 (step S304 of FIG. 28).

Subsequently, the card reader/writer 22 reads out the data stored in the SIM such as the SIM_ID and the telephone number within the SIM card 11 (steps S413, S414 of FIG. 29) and writes it onto the RFID main body 12 provided to the card holder 11a (step S305 of FIG. 28, steps S415, S416 of FIG. 29). The data copy may be performed before writing the URL in the SIM card, that is, right after inserting the SIM card.

Then, the user U pulls out the card holder 11a holding the SIM card 11 from the card reader/writer 22 (step S422 of FIG. 30), and peels off the RFID seal 12a from the card holder 11a to affix it to the portable telephone 1 (step S423 of FIG. 30, see FIG. 27A).

The user sets the portable telephone 1 into the RFID reader/writer 222 (concave part) of the portal site data providing device 2 when performing editing (customize) of own portal site which is previously registered (step S423 of FIG. 30, see FIG. 27B). Thereby, the portal site data providing device 2 becomes communicable with the RFID main body 12 mounted to the portable telephone 1 (NO in step S301 of FIG. 28, YES is step S306 of FIG. 28).

Then, in the RFID reader/writer 222, the PIN code and the SIM_ID are read out from the RFID 12 and the authentication of the user is performed through the RFID 12 affixed to the portable telephone 1 (step S307 of FIG. 28, steps S424-S432 of FIG. 30).

When the authentication of the user is succeeded, it becomes possible for the user to log in to the portal site data providing device 2 (step S433 of FIG. 30) and editing of the portal site and the like as described above can be performed.

In short, in the embodiment, first, for performing the collation processing by taking out the memory medium such as the SIM card which holds the identification data from the portable terminal, the identification data and the like stored in the memory medium to be collated are stored once in the noncontact memory medium such as the RFID tag which enables noncontact reading. By mounting the noncontact memory medium so that it can be readout from outside by, for example, affixing it to the outer face of the portable terminal, it is possible to read out the identification data and the like from the noncontact memory medium at the time of making an access later on. Thus, it enables to suppress an inconvenience such as removing the medium, for example, the SIM card from the portable terminal every time when collating the user. Therefore, the convenience for the user can be improved. Especially, by copying the data peculiar to the user within the SIM card into the RFID to be used for the user authentication, it is possible to perform the more accurate user authentication.

The above-described embodiments are described by referring to the case where the user performs editing of the own portal site by logging in the system using the RFID to which the data for specifying the user such as the data within the SIM card is copied. However, the processing performed after the log-in is not limited to the one described above. For example, the log-in may be achieved by performing the authentication using the RFID for charging the prepaid-system communication fee to the own portable telephone 1.

Figure 26B:
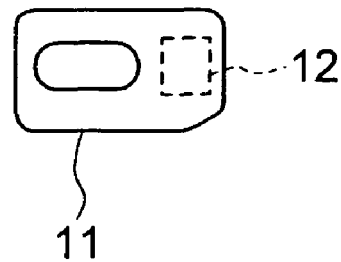

Further, described in the above is the case where the RFID main body 12 is built in the RFID seal 12a and it is mounted to the portable telephone 1. However, it is not necessarily limited to this form in which the RFID is mounted to the portable telephone 1. For example, as shown in FIG. 26B, the RFID main body 12 may be built in or mounted to the SIM card 11 itself. Even with this form, the RFID to which the data within the SIM card is copied is mounted to the portable telephone 1 to which the SIM card 11 is mounted. Therefore, the identification data can be read out from the portable telephone 1 without contact in the same manner as described above so that it is possible to reduce the complication such as taking out the SIM card and the like.

Further, the above-described embodiments are described by referring to the case where the portal site data providing device 2 reads out the data stored in the RFID 12 which is affixed to the portable telephone 1. However, the portal site data providing device 2 may have a function of storing a prescribed data into the RFID 12 which is affixed to the portable telephone 1. In such a case, the portable telephone 1 has a function of reading out the data from the affixed RFID 12. Thereby, the data can be read/written from/to the RFID even after the RFID 12 is affixed to the portable telephone 1, so that it is possible to store the desired contents to the RFID 12 through the portal site data providing device 2 by simply placing the portable telephone 1 in the concave part formed in the RFID reader/writer 222 of the portal site data providing device 2. Then, it is possible to use the obtained contents through reading it out from the RFID 12 by the portable telephone 1. Therefore, in the same manner as described above, it becomes unnecessary to remove the SIM card as the memory built in the portable telephone every time when obtaining the data from a prescribed device to the portable telephone 1. Thus, the convenience for the user can be improved while maintaining the security.

INDUSTRIAL APPLICABILITY

The present invention enables to store the applicable data which are different for each user, such as the URL accessible to the portal site peculiar to the user and the communication fee data for enabling to achieve communication by the prepaid portable terminal, while maintaining the security. Therefore, the convenience for the user when using the portable terminal can be improved so that the present invention has an industrial applicability.

The invention claimed is:

1. A data writing apparatus for a portable terminal memory medium comprising: a portal site data providing device for directly writing portal site data, including a portal site Universal Resource Locator (URL), to the portable terminal memory medium, wherein a portal site comprises a webpage displaying personalized user content, wherein the content comprises links for websites or information that is fetched from the websites; a portal managing server connected through a network for managing the portal site data, user information provided from the portal site data providing device, identification data of the user stored in the portable terminal memory medium, and identification data of the user registered in a portal managing database of the portal managing server; and a contents server for distributing contents selected by the user by building the portal website corresponding to the URL, wherein the contents selected by the user and added to the portal website can include both contents requiring a charge to be paid to the data writing apparatus in order to be added to the portal website and contents that are free to add, and wherein by associated operation of the portal site data providing device and the portable managing server, the data writing apparatus writes the URL of the portal site to the portable terminal memory medium when the identification data of the user stored in the portable terminal memory medium of the portable terminal is registered in the portal managing server as a user registration data, wherein the data writing apparatus removably receives the portable terminal memory for writing, and permits a customized portal site to be accessed on the user's portable terminal when the portable terminal reads the portable terminal memory medium.

2. The data writing apparatus for a portable terminal memory medium according to claim 1, the portal site data providing device comprising:
a data reading/writing device having a function of reading out data stored in a memory medium of a portable terminal and a function of writing, to the memory medium, an applicable data which is required for the portable terminal; and
a data collation device for collating an identification data peculiar to a user of the portable terminal, which is read out from the memory medium by the data reading/writing device, with a user registration data which is registered in advance, and for outputting a writing command to the data reading/writing device only when the data are consistent, wherein
the data reading/writing device writes the applicable data to the memory medium on condition that there is an input of the writing command.

3. The data writing apparatus for a portable terminal memory according to claim 2, further comprising:
an input device for inputting writing data specifying information for specifying contents of the applicable data; and
a writing data specifying information receiving device for receiving the writing data specifying information requested by a user, which is inputted from the input device, wherein
the data reading/writing device writes the applicable data which corresponds to the writing data specifying information onto the memory medium according to the writing command.

4. The data writing apparatus for a portable terminal memory according to claim 3, wherein the writing data specifying information is a communication fee data charged for connecting a portable terminal to a network.

5. The data writing apparatus for a portable terminal memory according to claim 3, wherein the writing data specifying information is portal specifying information for specifying contents of a portal site which is displayed when connecting to a network through a portable terminal.

6. The data writing apparatus for a portable terminal memory according to claim 2, wherein:
the portable terminal is a portable telephone;
the identification data peculiar to the user is an identification data which is allotted to a user-registered portable telephone by each user; and
the data collation device collates the identification data read out from the memory medium with a user registration data held by a communication carrier of the portable telephone.

7. The data writing apparatus for a portable terminal memory according to claim 6, wherein the portable terminal is a GSM-type portable telephone and the memory medium is an SIM card.

8. The data writing apparatus for a portable terminal memory according to claim 2, wherein:
the memory medium is a contact medium, which is removably mounted to the portable terminal and is removed from the portable terminal to be inserted to the data reading/writing device; and
the data reading/writing device performs data reading/writing processing to the memory medium by being in contact with the memory medium.

9. The data writing apparatus for a portable terminal memory according to claim 2, wherein:
the memory medium is a noncontact medium, which is mounted to the portable terminal and reading/writing of data is performed without a contact; and
the data reading/writing device performs data reading/writing processing to the memory medium in a noncontact state.

10. The data writing apparatus for a portable terminal memory according to claim 9, wherein the noncontact memory medium is an RFID tag.

11. The data writing apparatus for a portable terminal memory according to claim 2, wherein:
the memory medium uses both a contact medium which is removed form the portable terminal to be inserted to the data reading/writing device and a noncontact medium which is mounted to the portable terminal for performing reading/writing of data without a contact; and
the data reading/writing device has a function of performing reading/writing of a data to the memory medium by being in contact with the memory medium and a function of copying the data which is to be read/written from/to the noncontact memory medium.

12. The data writing system of claim 1, wherein the portal site data providing device comprises:
a display functioning as a touch panel from which a user can select contents; and
a reader/writer for reading/writing data, including selected contents, from/to a storage region of the portable terminal memory medium.

* * * * *